US009835829B2

United States Patent
Liu et al.

(10) Patent No.: US 9,835,829 B2
(45) Date of Patent: *Dec. 5, 2017

(54) OPTICAL IMAGE CAPTURING SYSTEM

(71) Applicant: ABILITY OPTO-ELECTRONICS TECHNOLOGY CO., LTD., Taichung (TW)

(72) Inventors: Yao-Wei Liu, Taichung (TW); Nai-Yuan Tang, Taichung (TW); Yeong-Ming Chang, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,575

(22) Filed: Mar. 18, 2016

(65) Prior Publication Data

US 2017/0010446 A1    Jan. 12, 2017

(30) Foreign Application Priority Data

Jul. 9, 2015   (TW) .............................. 104122331 A

(51) Int. Cl.

| G02B 13/18 | (2006.01) |
|---|---|
| G02B 3/02 | (2006.01) |
| G02B 13/00 | (2006.01) |
| G02B 9/60 | (2006.01) |
| G02B 13/06 | (2006.01) |
| G02B 27/64 | (2006.01) |

(52) U.S. Cl.
CPC ........... *G02B 13/0045* (2013.01); *G02B 9/60* (2013.01); *G02B 13/06* (2013.01); *G02B 27/646* (2013.01)

(58) Field of Classification Search
CPC .... G02B 13/0045; G02B 7/04; G02B 27/646; G02B 9/60; G02B 5/20
USPC .................................................. 359/714, 770
See application file for complete search history.

(56) References Cited

FOREIGN PATENT DOCUMENTS

| EP | 2405292 A3 | 5/2013 |
|---|---|---|
| TW | 201235694 A | 9/2012 |
| WO | 2012132455 A1 | 10/2012 |

OTHER PUBLICATIONS

Examination Report for TW104122331, dated Oct. 3, 2016, Total of 4 pages.
Search Report for TW104122331, dated Sep. 26, 2016, Total of 1 pages.
Abstract of TW201235694, Total of 1 page.
Abstract of WO2012132455A1, Total of 1 page.

*Primary Examiner* — Alicia M Harrington
(74) *Attorney, Agent, or Firm* — Lynette Wylie; Apex Juris, pllc.

(57) ABSTRACT

An optical image capturing system includes, along the optical axis in order from an object side to an image side, a first lens, a second lens, a third lens, a fourth lens, and a fifth lens. At least one lens among the first to the fifth lenses has positive refractive force. The fifth lens can have negative refractive force, wherein both surfaces thereof are aspheric, and at least one surface thereof has an inflection point. The lenses in the optical image capturing system which have refractive power include the first to the fifth lenses. The optical image capturing system can increase aperture value and improve the imaging quality for use in compact cameras.

22 Claims, 12 Drawing Sheets

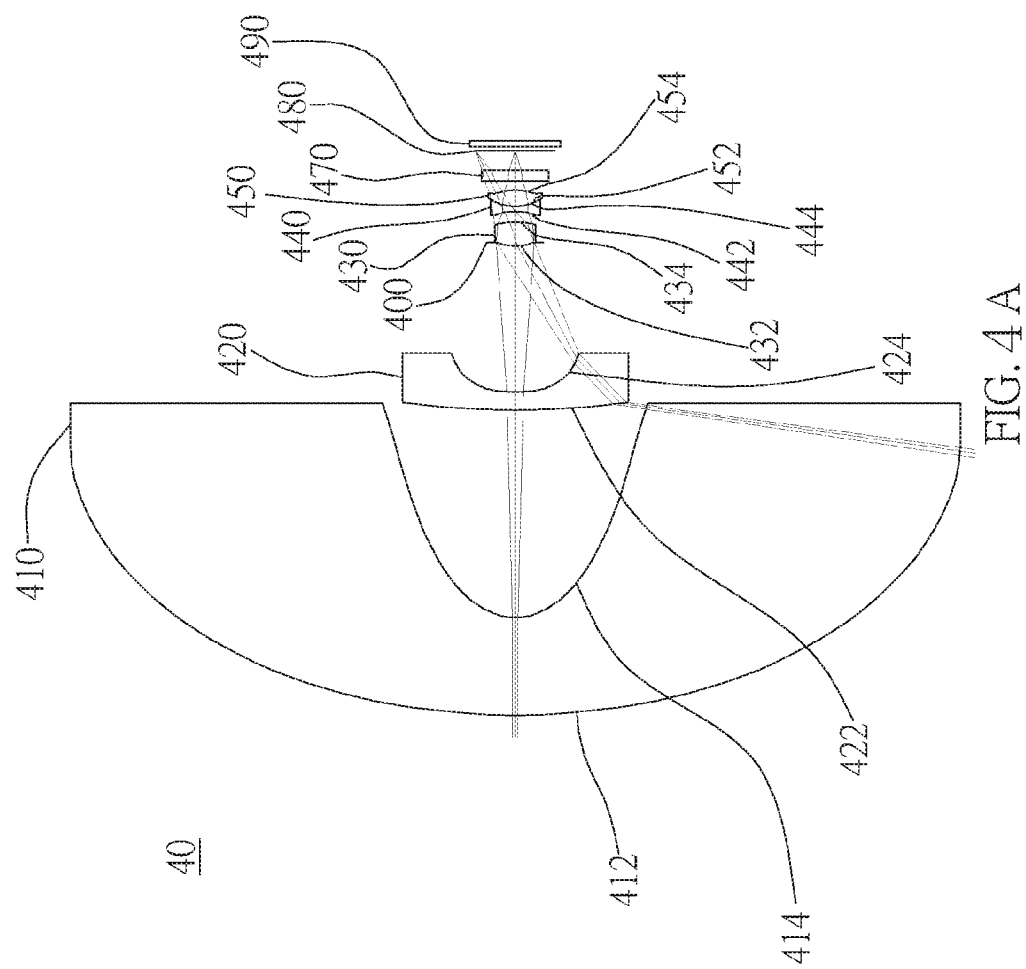

OPTICAL IMAGE CAPTURING SYSTEM

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has three or four lenses. However, the optical system is asked to take pictures in a dark environment, in other words, the optical system is asked to have a large aperture. The conventional optical system provides high optical performance as required.

It is an important issue to increase the quantity of light entering the lens. In addition, the modern lens is also asked to have several characters, including high image quality.

BRIEF SUMMARY OF THE INVENTION

The aspect of embodiment of the present disclosure directs to an optical image capturing system and an optical image capturing lens which use combination of refractive powers, convex and concave surfaces of five-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens:

A height for image formation of the optical image capturing system is denoted by HOI. A height of the optical image capturing system is denoted by HOS. A distance from the object-side surface of the first lens to the image-side surface of the fifth lens is denoted by InTL. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to an arc length of the shape of a surface and a surface profile:

For any surface of any lens, a profile curve length of the maximum effective half diameter is, by definition, measured from a start point where the optical axis of the belonging optical image capturing system passes through the surface of the lens, along a surface profile of the lens, and finally to an end point of the maximum effective half diameter thereof. In other words, the curve length between the aforementioned start and end points is the profile curve length of the maximum effective half diameter, which is denoted by ARS. For example, the profile curve length of the maximum effective half diameter of the object-side surface of the first lens is denoted by ARS11, the profile curve length of the maximum effective half diameter of the image-side surface of the first lens is denoted by ARS12, the profile curve length of the maximum effective half diameter of the object-side surface of the second lens is denoted by ARS21, the profile curve length of the maximum effective half diameter of the image-side surface of the second lens is denoted by ARS22, and so on.

For any surface of any lens, a profile curve length of a half of the entrance pupil diameter (HEP) is, by definition, measured from a start point where the optical axis of the belonging optical image capturing system passes through the surface of the lens, along a surface profile of the lens, and finally to a coordinate point of a perpendicular distance where is a half of the entrance pupil diameter away from the optical axis. In other words, the curve length between the aforementioned stat point and the coordinate point is the profile curve length of a half of the entrance pupil diameter (HEP), and is denoted by ARE. For example, the profile curve length of a half of the entrance pupil diameter (HEP) of the object-side surface of the first lens is denoted by ARE11, the profile curve length of a half of the entrance pupil diameter (HEP) of the image-side surface of the first lens is denoted by ARE12, the profile curve length of a half of the entrance pupil diameter (HEP) of the object-side surface of the second lens is denoted by ARE21, the profile curve length of a half of the entrance pupil diameter (HEP) of the image-side surface of the second lens is denoted by ARE22, and so on.

The lens parameter related to a depth of the lens shape:

A distance in parallel with the optical axis from a point where the optical axis passes through to an end point of the maximum effective semi diameter on the object-side surface of the fifth lens is denoted by InRS51 (the depth of the maximum effective semi diameter). A distance in parallel with the optical axis from a point where the optical axis passes through to an end point of the maximum effective semi diameter on the image-side surface of the fifth lens is denoted by InRS52 (the depth of the maximum effective semi diameter). The depth of the maximum effective semi diameter (sinkage) on the object-side surface or the image-side surface of any other lens is denoted in the same manner.

The lens parameter related to the lens shape:

A critical point C is a tangent point on a surface of a specific lens, and the tangent point is tangent to a plane perpendicular to the optical axis and the tangent point cannot be a crossover point on the optical axis. To follow the past, a distance perpendicular to the optical axis between a critical point C41 on the object-side surface of the fourth lens and the optical axis is HVT41 (instance), and a distance perpendicular to the optical axis between a critical point C42 on the image-side surface of the fourth lens and the optical axis is HVT42 (instance). A distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point on the object-side or image-side surface of other lenses the optical axis is denoted in the same manner.

The object-side surface of the fifth lens has one inflection point IF511 which is nearest to the optical axis, and the sinkage value of the inflection point IF511 is denoted by SGI511 (instance). A distance perpendicular to the optical axis between the inflection point IF511 and the optical axis is HIF511 (instance). The image-side surface of the fifth lens has one inflection point IF521 which is nearest to the optical axis, and the sinkage value of the inflection point IF521 is denoted by SGI521 (instance). A distance perpendicular to the optical axis between the inflection point IF521 and the optical axis is HIF521 (instance).

The object-side surface of the fifth lens has one inflection point IF512 which is the second nearest to the optical axis, and the sinkage value of the inflection point IF512 is denoted by SGI512 (instance). A distance perpendicular to the optical axis between the inflection point IF512 and the optical axis is HIF512 (instance). The image-side surface of the fifth lens has one inflection point IF522 which is the second nearest to the optical axis, and the sinkage value of the inflection point IF522 is denoted by SGI522 (instance). A distance perpendicular to the optical axis between the inflection point IF522 and the optical axis is HIF522 (instance).

The object-side surface of the fifth lens has one inflection point IF513 which is the third nearest to the optical axis, and the sinkage value of the inflection point IF513 is denoted by SGI513 (instance). A distance perpendicular to the optical axis between the inflection point IF513 and the optical axis is HIF513 (instance). The image-side surface of the fifth lens has one inflection point IF523 which is the third nearest to the optical axis, and the sinkage value of the inflection point IF523 is denoted by SGI523 (instance). A distance perpendicular to the optical axis between the inflection point IF523 and the optical axis is HIF523 (instance).

The object-side surface of the fifth lens has one inflection point IF514 which is the fourth nearest to the optical axis, and the sinkage value of the inflection point IF514 is denoted by SGI514 (instance). A distance perpendicular to the optical axis between the inflection point IF514 and the optical axis is HIF514 (instance). The image-side surface of the fifth lens has one inflection point IF524 which is the fourth nearest to the optical axis, and the sinkage value of the inflection point IF524 is denoted by SGI524 (instance). A distance perpendicular to the optical axis between the inflection point IF524 and the optical axis is HIF524 (instance).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

Transverse aberration on an edge of an aperture is denoted by STA, which stands for STOP transverse aberration, and is used to evaluate the performance of one specific optical image capturing system. The transverse aberration of light in any field of view can be calculated with a tangential fan or a sagittal fan. More specifically, the transverse aberration caused when the longest operation wavelength (e.g., 650 nm or 656 nm) and the shortest operation wavelength (e.g., 470 nm or 486 nm) pass through the edge of the aperture can be used as the reference for evaluating performance. The coordinate directions of the aforementioned tangential fan can be further divided into a positive direction (upper light) and a negative direction (lower light). The longest operation wavelength which passes through the edge of the aperture has an imaging position on the image plane in a particular field of view, and the reference wavelength of the mail light (e.g., 555 nm or 587.5 nm) has another imaging position on the image plane in the same field of view. The transverse aberration caused when the longest operation wavelength passes through the edge of the aperture is defined as a distance between these two imaging positions. Similarly, the shortest operation wavelength which passes through the edge of the aperture has an imaging position on the image plane in a particular field of view, and the transverse aberration caused when the shortest operation wavelength passes through the edge of the aperture is defined as a distance between the imaging position of the shortest operation wavelength and the imaging position of the reference wavelength. The performance of the optical image capturing system can be considered excellent if the transverse aberrations of the shortest and the longest operation wavelength which pass through the edge of the aperture and image on the image plane in 0.7 field of view (i.e., 0.7 times the height for image formation HOI) are both less than 20 µm or 20 pixels. Furthermore, for a stricter evaluation, the performance cannot be considered excellent unless the transverse aberrations of the shortest and the longest operation wavelength which pass through the edge of the aperture and image on the image plane in 0.7 field of view are both less than 10 µm or 10 pixels.

The optical image capturing system has a maximum image height HOI on the image plane vertical to the optical axis. A transverse aberration at 0.7 HOI in the positive direction of the tangential fan after the longest operation wavelength passing through the edge of the aperture is denoted by PLTA; a transverse aberration at 0.7 HOI in the positive direction of the tangential fan after the shortest operation wavelength passing through the edge of the aperture is denoted by PSTA; a transverse aberration at 0.7 HOI in the negative direction of the tangential fan after the longest operation wavelength passing through the edge of the aperture is denoted by NLTA; a transverse aberration at 0.7 HOI in the negative direction of the tangential fan after the shortest operation wavelength passing through the edge of the aperture is denoted by NSTA; a transverse aberration at 0.7 HOI of the sagittal fan after the longest operation wavelength passing through the edge of the aperture is denoted by SLTA; a transverse aberration at 0.7 HOI of the sagittal fan after the shortest operation wavelength passing through the edge of the aperture is denoted by SSTA.

The present invention provides an optical image capturing system, in which the fifth lens is provided with an inflection point at the object-side surface or at the image-side surface to adjust the incident angle of each view field and modify the ODT and the TDT. In addition, the surfaces of the fifth lens are capable of modifying the optical path to improve the imaging quality.

The optical image capturing system of the present invention includes a first lens, a second lens, a third lens, a fourth lens, a fifth lens, and an image plane in order along an optical axis from an object side to an image side. The first lens has refractive power. Both the object-side surface and the image-side surface of the fifth lens are aspheric surfaces. The optical image capturing system satisfies:

$1.2 \leq f/HEP \leq 6.0$; $0.5 \leq HOS/f \leq 3.0$; $0<InTL/HOS<0.9$; and $0.9 \leq 2(ARE/HEP) \leq 1.5$;

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the fifth lens on the optical axis; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, a fourth lens, a fifth lens, and an image plane in order along an optical axis from an object side to an image side. The first lens has negative refractive power, wherein the object-side surface thereof can be convex near the optical axis. The second lens has refractive power. The third lens has refractive power. The fourth lens has refractive power. The fifth lens has refractive power. The object-side surface and the image-side surface of at least one lens among the first lens to the fifth lens are both aspheric surfaces. At least one lens among the first lens to the fifth lens has at least an inflection point on at least a surface thereof. At least one lens between the second lens and the fifth lens has positive refractive power. The optical image capturing system satisfies:

$1.2 \leq f/HEP \leq 6.0$; $0.5 \leq HOS/f \leq 3.0$; $0<InTL/HOS<0.9$; and $0.9 \leq 2(ARE/HEP) \leq 1.5$;

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the fifth lens on the optical axis; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, a fourth lens, a fifth lens, and an image plane, in order along an optical axis from an object side to an image side. The number of the lenses having refractive power in the optical image capturing system is five. At least one lens among the first to the fifth lenses has at least an inflection point on at least one surface thereof. The first lens has negative refractive power, and the second lens has refractive power. The third lens has positive refractive power. The fourth lens has refractive power. The fifth lens has refractive power. The object-side surface and the image-side surface of at least one lens among the first lens to the fifth lens are both aspheric surfaces. The optical image capturing system satisfies:

$1.2 \leq f/HEP \leq 3.5$; $0.5HOS/f 3.0$; $0<InTL/HOS<0.9$; and $0.9 \leq 2(ARE/HEP) \leq 1.5$;

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the fifth lens on the optical axis; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

For any surface of any lens, the profile curve length within the effective half diameter affects the ability of the surface to correct aberration and differences between optical paths of light in different fields of view. With longer profile curve length, the ability to correct aberration is better. However, the difficulty of manufacturing increases as well. Therefore, the profile curve length within the effective half diameter of any surface of any lens has to be controlled. The ratio between the profile curve length (ARS) within the effective half diameter of one surface and the thickness (TP) of the lens, which the surface belonged to, on the optical axis (i.e., ARS/TP) has to be particularly controlled. For example, the profile curve length of the maximum effective half diameter of the object-side surface of the first lens is denoted by ARS11, the thickness of the first lens on the optical axis is TP1, and the ratio between these two parameters is ARS11/TP1; the profile curve length of the maximum effective half diameter of the image-side surface of the first lens is denoted by ARS12, and the ratio between ARS12 and TP1 is ARS12/TP1. The profile curve length of the maximum effective half diameter of the object-side surface of the second lens is denoted by ARS21, the thickness of the second lens on the optical axis is TP2, and the ratio between these two parameters is ARS21/TP2; the profile curve length of the maximum effective half diameter of the image-side surface of the second lens is denoted by ARS22, and the ratio between ARS22 and TP2 is ARS22/TP2. For any surface of other lenses in the optical image capturing system, the ratio between the profile curve length of the maximum effective half diameter thereof and the thickness of the lens which the surface belonged to is denoted in the same manner.

For any surface of any lens, the profile curve length within a half of the entrance pupil diameter (HEP) affects the ability of the surface to correct aberration and differences between optical paths of light in different fields of view. With longer profile curve length, the ability to correct aberration is better. However, the difficulty of manufacturing increases as well. Therefore, the profile curve length within a half of the entrance pupil diameter (HEP) of any surface of any lens has to be controlled. The ratio between the profile curve length (ARE) within a half of the entrance pupil diameter (HEP) of one surface and the thickness (TP) of the lens, which the surface belonged to, on the optical axis (i.e., ARE/TP) has to be particularly controlled. For example, the profile curve length of a half of the entrance pupil diameter (HEP) of the object-side surface of the first lens is denoted by ARE11, the thickness of the first lens on the optical axis is TP1, and the ratio between these two parameters is ARE11/TP1; the profile curve length of a half of the entrance pupil diameter (HEP) of the image-side surface of the first lens is denoted by ARE12, and the ratio between ARE12 and TP1 is ARE12/TP1. The profile curve length of a half of the entrance pupil diameter (HEP) of the object-side surface of the second lens is denoted by ARE21, the thickness of the second lens on the optical axis is TP2, and the ratio between these two parameters is ARE21/TP2; the profile curve length of a half of the entrance pupil diameter (HEP) of the image-side surface of the second lens is denoted by ARE22, and the ratio between ARE22 and TP2 is ARE22/TP2. For any surface of other lenses in the optical image capturing system, the ratio between the profile curve length of a half of the entrance pupil diameter (HEP) thereof and the thickness of the lens which the surface belonged to is denoted in the same manner.

In an embodiment, a height of the optical image capturing system (HOS) can be reduced while |f1|>f5.

In an embodiment, when |f2|+|f3|+|f4| and |f1|+|f5| of the lenses satisfy the aforementioned conditions, at least one lens among the second to the fourth lenses could have weak positive refractive power or weak negative refractive power. Herein the weak refractive power means the absolute value of the focal length of one specific lens is greater than 10. When at least one lens among the second to the fourth lenses has weak positive refractive power, it may share the positive refractive power of the first lens, and on the contrary, when at least one lens among the second to the fourth lenses has weak negative refractive power, it may fine turn and correct the aberration of the system.

In an embodiment, the fifth lens could have negative refractive power, and an image-side surface thereof is concave, it may reduce back focal length and size. Besides, the fifth lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
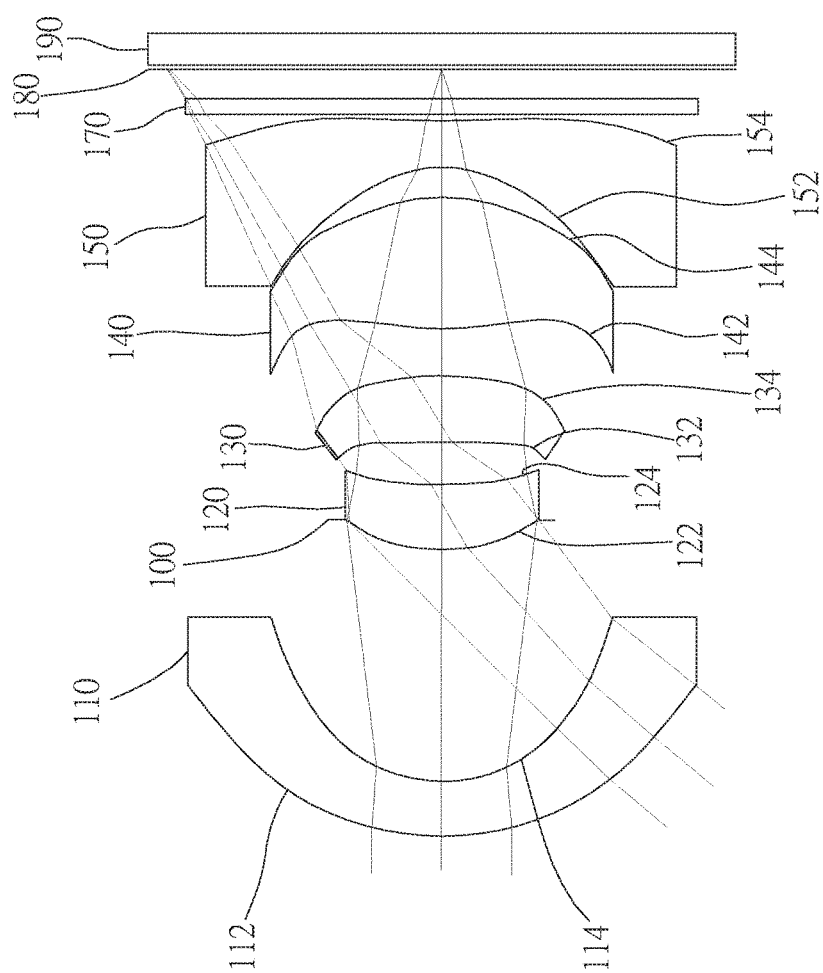
FIG. 1A is a schematic diagram of a first embodiment of the present invention.

An optical image capturing system of the present invention includes a first lens, a second lens, a third lens, a fourth lens, a fifth lens, and an image plane from an object side to an image side. The optical image capturing system further is provided with an image sensor at an image plane.

The optical image capturing system can work in three wavelengths, including 486.1 nm, 587.5 nm, and 656.2 nm, wherein 587.5 nm is the main reference wavelength and is the reference wavelength for obtaining the technical characters. The optical image capturing system can also work in five wavelengths, including 470 nm, 510 nm, 555 nm, 610 nm, and 650 nm wherein 555 nm is the main reference wavelength, and is the reference wavelength for obtaining the technical characters.

The optical image capturing system of the present invention satisfies $0.5 \leq \Sigma PPR/|\Sigma NPR| \leq 3.0$, and a preferable range is $1 \leq \Sigma PPR/|\Sigma NPR| \leq 2.5$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; $\Sigma PPR$ is a sum of the PPRs of each positive lens; and $\Sigma NPR$ is a sum of the NPRs of each negative lens. It is helpful for control of an entire refractive power and an entire length of the optical image capturing system.

The image sensor is provided on the image plane. The optical image capturing system of the present invention satisfies $HOS/HOI \leq 25$ and $0.5 \leq HOS/f \leq 25$, and a preferable range is $1 \leq HOS/HOI \leq 20$ and $1 \leq HOS/f \leq 20$, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies $0.2 \leq nS/HOS \leq 1.1$, where InS is a distance between the aperture and the image plane. It is helpful for size reduction and wide angle.

The optical image capturing system of the present invention satisfies $0.1 \leq \Sigma TP/InTL 0.9$, where InTL is a distance between the object-side surface of the first lens and the image-side surface of the fifth lens, and $\Sigma TP$ is a sum of central thicknesses of the lenses on the optical axis. It is helpful for the contrast of image and yield rate of manufacture and provides a suitable back focal length for installation of other elements.

The optical image capturing system of the present invention satisfies $0.01 \leq |R1/R2| < 100$, and a preferable range is $0.05 < |R1/R2| < 80$, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies $-50 < (R9-R10)/(R9+R10) < 50$, where R9 is a radius of curvature of the object-side surface of the fifth lens, and R10 is a radius of curvature of the image-side surface of the fifth lens. It may modify the astigmatic field curvature.

The optical image capturing system of the present invention satisfies $IN12/f \leq 5.0$, where IN12 is a distance on the optical axis between the first lens and the second lens. It may correct chromatic aberration and improve the performance.

The optical image capturing system of the present invention satisfies $IN45/f \leq 5.0$, where IN45 is a distance on the optical axis between the fourth lens and the fifth lens. It may correct chromatic aberration and improve the performance.

The optical image capturing system of the present invention satisfies $0.1 \leq (TP1+IN12)/TP2 \leq 50.0$, where TP1 is a central thickness of the first lens on the optical axis, and TP2 is a central thickness of the second lens on the optical axis. It may control the sensitivity of manufacture of the system and improve the performance.

The optical image capturing system of the present invention satisfies $0.1 \leq (TP5+IN45)/TP4 \leq 50.0$, where TP4 is a central thickness of the fourth lens on the optical axis, TP5 is a central thickness of the fifth lens on the optical axis, and IN45 is a distance between the fourth lens and the fifth lens. It may control the sensitivity of manufacture of the system and improve the performance.

The optical image capturing system of the present invention satisfies $0.1 \leq TP3/(IN23+TP3+IN34) < 1$, where TP2 is a central thickness of the second lens on the optical axis, TP3 is a central thickness of the third lens on the optical axis, TP4 is a central thickness of the fourth lens on the optical axis, IN23 is a distance on the optical axis between the second lens and the third lens, IN34 is a distance on the optical axis between the third lens and the fourth lens, and InTL is a distance between the object-side surface of the first lens and the image-side surface of the fifth lens. It may fine tune and correct the aberration of the incident rays layer by layer, and reduce the height of the system.

The optical image capturing system satisfies $0 \text{ mm} \leq HVT51 \leq 3 \text{ mm}$; $0 \text{ mm} < HVT52 \leq 6 \text{ mm}$; $0 \leq HVT51/HVT52$; $0 \text{ mm} \leq |SGC51| \leq 0.5 \text{ mm}$; $0 \text{ mm} < |SGC52| \leq 2 \text{ mm}$; and $0 < |SGC52|/(|SGC52|+TP5) \leq 0.9$, where HVT51 a distance perpendicular to the optical axis between the critical point C51 on the object-side surface of the fifth lens and the optical axis; HVT52 a distance perpendicular to the optical axis between the critical point C52 on the image-side surface of the fifth lens and the optical axis; SGC51 is a distance in parallel with the optical axis between an point on the object-side surface of the fifth lens where the optical axis passes through and the critical point C51; SGC52 is a distance in parallel with the optical axis between an point on the image-side surface of the fifth lens where the optical axis passes through and the critical point C52. It is helpful to correct the off-axis view field aberration.

The optical image capturing system satisfies $0.2 \leq HVT52/HOI \leq 0.9$, and preferably satisfies $0.3 \leq HVT52/HOI \leq 0.8$. It may help to correct the peripheral aberration.

The optical image capturing system satisfies $0 \leq HVT52/HOS \leq 0.5$, and preferably satisfies $0.2 \leq HVT52/HOS \leq 0.45$. It may help to correct the peripheral aberration.

The optical image capturing system of the present invention satisfies $0 < SGI511/(SGI511+TP5) \leq 0.9$; $0 < SGI521/(SGI521+TP5) \leq 0.9$, and it is preferable to satisfy $0.1 \leq SGI511/(SGI511+TP5) \leq 0.6$; $0.1 \leq SGI521/(SGI521+TP5) \leq 0.6$, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

The optical image capturing system of the present invention satisfies $0 < SGI512/(SGI512+TP5) \leq 0.9$; $0 < SGI522/$ (SGI522+TP5)≤0.9, and it is preferable to satisfy 0.1≤SGI512/(SGI512+TP5)≤0.6; 0.1≤SGI522/(SGI522+TP5)≤0.6, where SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the image-side surface, which is the second closest to the optical axis.

The optical image capturing system of the present invention satisfies 0.001 mm≤|HIF511|≤5 mm; 0.001 mm≤|HIF521|≤5 mm, and it is preferable to satisfy 0.1 mm≤|HIF511|≤3.5 mm; 1.5 mm≤|HIF521|≤3.5 mm, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

The optical image capturing system of the present invention satisfies 0.001 mm≤|HIF512|≤5 mm; 0.001 mm≤|HIF522|≤5 mm, and it is preferable to satisfy 0.1 mm≤|HIF522|≤3.5 mm; 0.1 mm≤|HIF512|≤3.5 mm, where HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

The optical image capturing system of the present invention satisfies 0.001 mm≤|HIF513|≤5 mm; 0.001 mm≤|HIF523|≤5 mm, and it is preferable to satisfy 0.1 mm≤|HIF523|≤3.5 mm; 0.1 mm≤|HIF513|≤3.5 mm, where HIF513 is a distance perpendicular to the optical axis between the inflection point on the object-side surface of the fifth lens, which is the third closest to the optical axis, and the optical axis; HIF523 is a distance perpendicular to the optical axis between the inflection point on the image-side surface of the fifth lens, which is the third closest to the optical axis, and the optical axis.

The optical image capturing system of the present invention satisfies 0.001 mm≤|HIF514|≤5 mm; 0.001 mm≤|HIF524|≤5 mm, and it is preferable to satisfy 0.1 mm≤|HIF524|≤3.5 mm; 0.1 mm≤|HIF514|≤3.5 mm, where HIF514 is a distance perpendicular to the optical axis between the inflection point on the object-side surface of the fifth lens, which is the fourth closest to the optical axis, and the optical axis; HIF524 is a distance perpendicular to the optical axis between the inflection point on the image-side surface of the fifth lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z = ch_2/[1+[1(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the fifth lenses could be aspheric that can obtain more control parameters to reduce aberration. The number of aspheric glass lenses could be less than the conventional spherical glass lenses, which is helpful for reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the fifth lens of the optical image capturing system of the present invention can be a light filter, which filters out light of wavelength shorter than 500 nm. Such effect can be achieved by coating on at least one surface of the lens, or by using materials capable of filtering out short waves to make the lens.

We provide several embodiments in conjunction with the accompanying drawings for the best understanding, which are:

First Embodiment

Figure 1B:
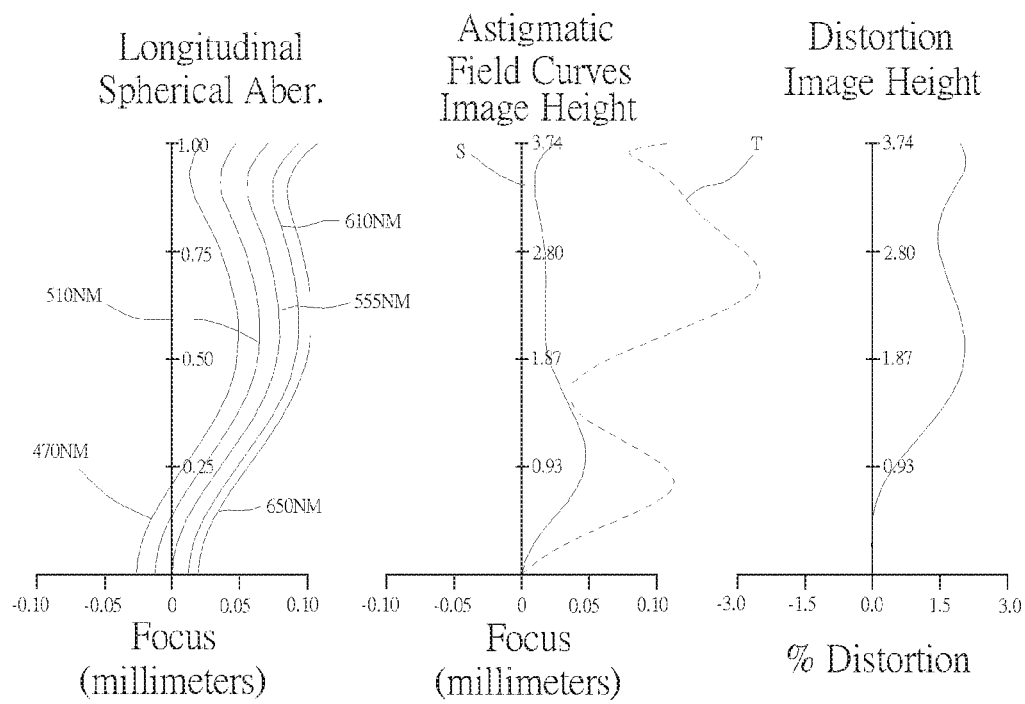
FIG. 1B shows curve diagrams of longitudinal spherical aberration, astigmatic field, and optical distortion of the optical image capturing system in the order from left to right of the first embodiment of the present application.
Figure 1C:
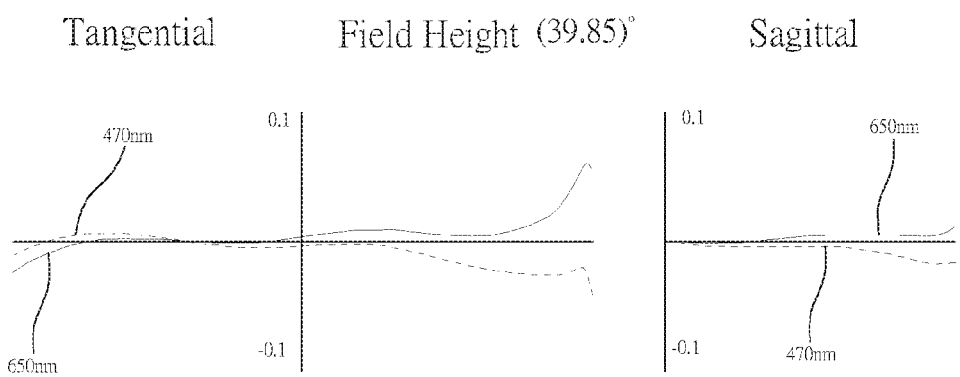
FIG. 1C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, a fourth lens 140, a fifth lens 150, an infrared rays filter 180, an image plane 190, and an image sensor 192. FIG. 1C shows a tangential fan and a sagittal fan of the optical image capturing system 10 of the first embodiment of the present application, and a transverse aberration diagram at 0.7 field of view when a longest operation wavelength and a shortest operation wavelength pass through an edge of the aperture 100.

The first lens 110 has negative refractive power and is made of plastic. An object-side surface 112 thereof, which faces the object side, is a convex aspheric surface, and an image-side surface 114 thereof, which faces the image side, is a concave aspheric surface. The object-side surface 112 has an inflection point thereon. A profile curve length of the maximum effective half diameter of an object-side surface of the first lens 110 is denoted by ARS11, and a profile curve length of the maximum effective half diameter of the image-side surface of the first lens 110 is denoted by ARS12. A profile curve length of a half of an entrance pupil diameter (HEP) of the object-side surface of the first lens 110 is denoted by ARE11, and a profile curve length of a half of the entrance pupil diameter (HEP) of the image-side surface of the first lens 110 is denoted by ARE12. A thickness of the first lens 110 on the optical axis is TP1.

The first lens satisfies SGI111=1.96546 mm; |SGI111|/(|SGI111|+TP1)=0.72369, where SGI111 is a displacement in parallel with the optical axis from a point on the object-side surface of the first lens, through which the optical axis passes, to the inflection point on the object-side surface, which is the closest to the optical axis, and SGI121 is a displacement in parallel with the optical axis from a point on the image-side surface of the first lens, through which the optical axis passes, to the inflection point on the image-side surface, which is the closest to the optical axis.

The first lens satisfies HIF111=3.38542 mm; HIF111/HOI=0.90519, where HIF111 is a displacement perpendicular to the optical axis from a point on the object-side surface of the first lens, through which the optical axis passes, to the inflection point, which is the closest to the optical axis; HIF121 is a displacement perpendicular to the optical axis from a point on the image-side surface of the first lens, through which the optical axis passes, to the inflection point, which is the closest to the optical axis.

The second lens 120 has positive refractive power and is made of plastic. An object-side surface 122 thereof, which faces the object side, is a convex aspheric surface, and an image-side surface 124 thereof, which faces the image side, is a concave aspheric surface. A profile curve length of the maximum effective half diameter of an object-side surface of the second lens 120 is denoted by ARS21, and a profile curve length of the maximum effective half diameter of the image-side surface of the second lens 120 is denoted by ARS22. A profile curve length of a half of an entrance pupil diameter (HEP) of the object-side surface of the second lens 120 is denoted by ARE21, and a profile curve length of a half of the entrance pupil diameter (HEP) of the image-side surface of the second lens 120 is denoted by ARE22. A thickness of the second lens 120 on the optical axis is TP2.

For the second lens, a displacement in parallel with the optical axis from a point on the object-side surface of the second lens, through which the optical axis passes, to the inflection point on the image-side surface, which is the closest to the optical axis is denoted by SGI211, and a displacement in parallel with the optical axis from a point on the image-side surface of the second lens, through which the optical axis passes, to the inflection point on the image-side surface, which is the closest to the optical axis is denoted by SGI221.

For the second lens, a displacement perpendicular to the optical axis from a point on the object-side surface of the second lens, through which the optical axis passes, to the inflection point, which is the closest to the optical axis is denoted by HIF211, and a displacement perpendicular to the optical axis from a point on the image-side surface of the second lens, through which the optical axis passes, to the inflection point, which is the closest to the optical axis is denoted by HIF221.

The third lens 130 has positive refractive power and is made of plastic. An object-side surface 132, which faces the object side, is a convex aspheric surface, and an image-side surface 134, which faces the image side, is a convex aspheric surface. The object-side surface 132 has an inflection point. A profile curve length of the maximum effective half diameter of an object-side surface of the third lens 130 is denoted by ARS31, and a profile curve length of the maximum effective half diameter of the image-side surface of the third lens 130 is denoted by ARS32. A profile curve length of a half of an entrance pupil diameter (HEP) of the object-side surface of the third lens 130 is denoted by ARE31, and a profile curve length of a half of the entrance pupil diameter (HEP) of the image-side surface of the third lens 130 is denoted by ARE32. A thickness of the third lens 130 on the optical axis is TP3.

The third lens 130 satisfies SGI311=0.00388 mm; |SGI311|/(|SGI311|+TP3)=0.00414, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

For the third lens 130, SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the object-side surface, which is the second closest to the optical axis.

The third lens 130 further satisfies HIF311=0.38898 mm; HIF311/HOI=0.10400, where HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

For the third lens 130, HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The fourth lens 140 has positive refractive power and is made of plastic. An object-side surface 142, which faces the object side, is a convex aspheric surface, and an image-side surface 144, which faces the image side, is a convex aspheric surface. The object-side surface 142 has an inflection point. A profile curve length of the maximum effective half diameter of an object-side surface of the fourth lens 140 is denoted by ARS41, and a profile curve length of the maximum effective half diameter of the image-side surface of the fourth lens 140 is denoted by ARS42. A profile curve length of a half of an entrance pupil diameter (HEP) of the object-side surface of the fourth lens 140 is denoted by ARE41, and a profile curve length of a half of the entrance pupil diameter (HEP) of the image-side surface of the fourth lens 140 is denoted by ARE42. A thickness of the fourth lens 140 on the optical axis is TP4.

The fourth lens 140 satisfies SGI421=0.06508 mm; |SGI421|/(|SGI421|+TP4)=0.03459, where SGI411 is a displacement in parallel with the optical axis, from a point on the object-side surface of the fourth lens, through which the optical axis passes, to the inflection point on the object-side surface, which is the closest to the optical axis, and SGI421 is a displacement in parallel with the optical axis, from a point on the image-side surface of the fourth lens, through which the optical axis passes, to the inflection point on the image-side surface, which is the closest to the optical axis.

For the fourth lens 140, SGI412 is a displacement in parallel with the optical axis, from a point on the object-side surface of the fourth lens, through which the optical axis passes, to the inflection point on the object-side surface, which is the second closest to the optical axis, and SGI422 is a displacement in parallel with the optical axis, from a point on the image-side surface of the fourth lens, through which the optical axis passes, to the inflection point on the object-side surface, which is the second closest to the optical axis.

The fourth lens 140 further satisfies HIF421=0.85606 mm; HIF421/HOI=0.22889, where HIF411 is a distance perpendicular to the optical axis between the inflection point on the object-side surface of the fourth lens, which is the closest to the optical axis, and the optical axis; HIF421 is a distance perpendicular to the optical axis between the inflection point on the image-side surface of the fourth lens, which is the closest to the optical axis, and the optical axis.

For the fourth lens 140, HIF412 is a distance perpendicular to the optical axis between the inflection point on the object-side surface of the fourth lens, which is the second closest to the optical axis, and the optical axis; HIF422 is a distance perpendicular to the optical axis between the inflection point on the image-side surface of the fourth lens, which is the second closest to the optical axis, and the optical axis.

The fifth lens 150 has negative refractive power and is made of plastic. An object-side surface 152, which faces the object side, is a concave aspheric surface, and an image-side surface 154, which faces the image side, is a concave aspheric surface. The object-side surface 152 and the image-side surface 154 both have an inflection point. A profile curve length of the maximum effective half diameter of an object-side surface of the fifth lens 150 is denoted by ARS51, and a profile curve length of the maximum effective half diameter of the image-side surface of the fifth lens 150 is denoted by ARS52. A profile curve length of a half of an entrance pupil diameter (HEP) of the object-side surface of the fifth lens 150 is denoted by ARE51, and a profile curve length of a half of the entrance pupil diameter (HEP) of the image-side surface of the fifth lens 150 is denoted by ARE52. A thickness of the fifth lens 150 on the optical axis is TP5.

The fifth lens 150 satisfies SGI511=−1.51505 mm; |SGI511|/(|SGI511|+TP5)=0.70144; SGI521=0.01229 mm; |SGI521|/(|SGI521|+TP5)=0.01870, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

For the fifth lens 150, SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the object-side surface, which is the second closest to the optical axis.

The fifth lens 150 further satisfies HIF511=2.25435 mm; HIF511/HOI=0.60277; HIF521=0.82313 mm; HIF521/HOI=0.22009, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

For the fifth lens 150, HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

The infrared rays filter 180 is made of glass and between the fifth lens 150 and the image plane 190. The infrared rays filter 180 gives no contribution to the focal length of the system.

The optical image capturing system 10 of the first embodiment has the following parameters, which are f=3.03968 mm; f/HEP=1.6; HAF=50.001; and tan(HAF)=1.1918, where f is a focal length of the system; HAF is a half of the maximum field angle; and HEP is an entrance pupil diameter.

The parameters of the lenses of the first embodiment are f1=−9.24529 mm; |f/f1|=0.32878; f5=−2.32439; and |f1|>f5, where f1 is a focal length of the first lens 110; and f5 is a focal length of the fifth lens 150.

The first embodiment further satisfies |f2|+|f3|+|f4|=17.3009 mm; |f1|+|f5|=11.5697 mm and |f2|+|f3|+|f4|>|f1|+|f5|, where f2 is a focal length of the second lens 120, f3 is a focal length of the third lens 130, f4 is a focal length of the fourth lens 140, and f5 is a focal length of the fifth lens 150.

The optical image capturing system 10 of the first embodiment further satisfies ΣPPR=f/f2+f/f3+f/f4=1.86768; ΣNPR=f/f1+f/f5=−1.63651; ΣPPR/|ΣNPR|=1.14125; |f/f2|=0.47958; |f/f3|=0.38289; |f/f4|=1.00521; |f/f5|=1.30773, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system 10 of the first embodiment further satisfies InTL+BFL=HOS; HOS=10.56320 mm; HOI=3.7400 mm; HOS/HOI=2.8244; HOS/f=3.4751; InS=6.21073 mm; and InS/HOS=0.5880, where InTL is a distance between the object-side surface 112 of the first lens 110 and the image-side surface 154 of the fifth lens 150; HOS is a height of the image capturing system, i.e. a distance between the object-side surface 112 of the first lens 110 and the image plane 190; InS is a distance between the aperture 100 and the image plane 190; HOI is a half of a diagonal of an effective sensing area of the image sensor 192, i.e., the maximum image height; and BFL is a distance between the image-side surface 154 of the fifth lens 150 and the image plane 190.

The optical image capturing system 10 of the first embodiment further satisfies ΣTP=5.0393 mm; InTL=9.8514 mm and ΣTP/InTL=0.5115, where ΣTP is a sum of the thicknesses of the lenses 110-150 with refractive power. It is helpful for the contrast of image and yield rate of manufacture and provides a suitable back focal length for installation of other elements.

The optical image capturing system 10 of the first embodiment further satisfies |R1/R2|=1.9672, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R9−R10)/(R9+R10)=−1.1505, where R9 is a radius of curvature of the object-side surface 152 of the fifth lens 150, and R10 is a radius of curvature of the image-side surface 154 of the fifth lens 150. It may modify the astigmatic field curvature.

The optical image capturing system 10 of the first embodiment further satisfies ΣPP=f2+f3+f4=17.30090 mm; and f2/(f2+f3+f4)=0.36635, where ΣPP is a sum of the focal lengths fp of each lens with positive refractive power. It is helpful to share the positive refractive power of the second lens 120 to other positive lenses to avoid the significant aberration caused by the incident rays.

The optical image capturing system 10 of the first embodiment further satisfies ΣNP=f1+f5=−11.56968 mm; and f5/(f1+f5)=0.20090, where ΣNP is a sum of the focal lengths fn of each lens with negative refractive power. It is helpful to share the negative refractive power of the fifth lens 150 to the other negative lens, which avoids the significant aberration caused by the incident rays.

The optical image capturing system 10 of the first embodiment further satisfies IN12=3.19016 mm; IN12/f=1.04951, where IN12 is a distance on the optical axis between the first lens 110 and the second lens 120. It may correct chromatic aberration and improve the performance.

The optical image capturing system 10 of the first embodiment further satisfies IN45=0.40470 mm; IN45/f=0.13314, where IN45 is a distance on the optical axis between the fourth lens 140 and the fifth lens 150. It may correct chromatic aberration and improve the performance.

The optical image capturing system 10 of the first embodiment further satisfies TP1=0.75043 mm; TP2=0.89543 mm; TP3=0.93225 mm; and (TP1+IN12)/TP2=4.40078, where TP1 is a central thickness of the first lens 110 on the optical axis, TP2 is a central thickness of the second lens 120 on the optical axis, and TP3 is a central thickness of the third lens 130 on the optical axis. It may control the sensitivity of manufacture of the system and improve the performance.

The optical image capturing system 10 of the first embodiment further satisfies TP4=1.81634 mm; TP5=0.64488 mm; and (TP5+IN45)/TP4=0.57785, where TP4 is a central thickness of the fourth lens 140 on the optical axis, TP5 is a central thickness of the fifth lens 150 on the optical axis, and IN45 is a distance on the optical axis between the fourth lens 140 and the fifth lens 150. It may control the sensitivity of manufacture of the system and lower the total height of the system.

The optical image capturing system 10 of the first embodiment further satisfies TP2/TP3=0.96051; TP3/TP4=0.51325; TP4/TP5=2.81657; and TP3/(IN23+TP3+IN34)=0.43372, where IN34 is a distance on the optical axis between the third lens 130 and the fourth lens 140. It may control the sensitivity of manufacture of the system and lower the total height of the system.

The optical image capturing system 10 of the first embodiment further satisfies InRS41=−0.09737 mm; InRS42=−−1.31040 mm; |InRS41|/TP4=0.05361 and |InRS42|/TP4=0.72145, where InRS41 is a displacement in parallel with the optical axis from a point on the object-side surface 142 of the fourth lens, through which the optical axis passes, to a point at the maximum effective semi diameter of the object-side surface 142 of the fourth lens; InRS42 is a displacement in parallel with the optical axis from a point on the image-side surface 144 of the fourth lens, through which the optical axis passes, to a point at the maximum effective semi diameter of the image-side surface 144 of the fourth lens; and TP4 is a central thickness of the fourth lens 140 on the optical axis. It is helpful for manufacturing and shaping of the lenses and is helpful to reduce the size.

The optical image capturing system 10 of the first embodiment further satisfies HVT41=1.41740 mm; HVT42=0, where HVT41 a distance perpendicular to the optical axis between the critical point on the object-side surface 142 of the fourth lens and the optical axis; and HVT42 a distance perpendicular to the optical axis between the critical point on the image-side surface 144 of the fourth lens and the optical axis.

The optical image capturing system 10 of the first embodiment further satisfies InRS51=−1.63543 mm; InRS52=−0.34495 mm; |InRS51|/TP5=2.53604 and |InRS52|/TP5=0.53491, where InRS51 is a displacement in parallel with the optical axis from a point on the object-side surface 152 of the fifth lens, through which the optical axis passes, to a point at the maximum effective semi diameter of the object-side surface 152 of the fifth lens; InRS52 is a displacement in parallel with the optical axis from a point on the image-side surface 154 of the fifth lens, through which the optical axis passes, to a point at the maximum effective semi diameter of the image-side surface 154 of the fifth lens; and TP5 is a central thickness of the fifth lens 150 on the optical axis. It is helpful for manufacturing and shaping the lenses and is helpful to reduce the size.

The optical image capturing system 10 of the first embodiment satisfies HVT51=0; HVT52=1.35891 mm; and HVT51/HVT52=0, where HVT51 a distance perpendicular to the optical axis between the critical point on the object-side surface 152 of the fifth lens and the optical axis; and HVT52 a distance perpendicular to the optical axis between the critical point on the image-side surface 154 of the fifth lens and the optical axis.

The optical image capturing system 10 of the first embodiment satisfies HVT52/HOI=0.36334. It is helpful for correction of the aberration of the peripheral view field of the optical image capturing system.

The optical image capturing system 10 of the first embodiment satisfies HVT52/HOS=0.12865. It is helpful for correction of the aberration of the peripheral view field of the optical image capturing system.

The third lens 130 and the fifth lens 150 have negative refractive power. The optical image capturing system 10 of the first embodiment further satisfies NA5/NA3=0.368966, where NA3 is an Abbe number of the third lens 130; and NA5 is an Abbe number of the fifth lens 150. It may correct the aberration of the optical image capturing system.

The optical image capturing system 10 of the first embodiment further satisfies |TDT|=0.63350%; |ODT|=2.06135%, where TDT is TV distortion; and ODT is optical distortion.

For the fifth lens 150 of the optical image capturing system 10 in the first embodiment, a transverse aberration at 0.7 field of view in the positive direction of the tangential fan after the longest operation wavelength passing through the edge of the aperture 100 is denoted by PLTA, and is −0.042 mm; a transverse aberration at 0.7 field of view in the positive direction of the tangential fan after the shortest operation wavelength passing through the edge of the aperture 100 is denoted by PSTA, and is 0.056 mm; a transverse aberration at 0.7 field of view in the negative direction of the tangential fan after the longest operation wavelength passing through the edge of the aperture 100 is denoted by NLTA, and is −0.011 mm; a transverse aberration at 0.7 field of view in the negative direction of the tangential fan after the shortest operation wavelength passing through the edge of the aperture 100 is denoted by NSTA, and is −0.024 mm; a transverse aberration at 0.7 field of view of the sagittal fan after the longest operation wavelength passing through the edge of the aperture 100 is denoted by SLTA, and is −0.013 mm; a transverse aberration at 0.7 field of view of the sagittal fan after the shortest operation wavelength passing through the edge of the aperture 100 is denoted by SSTA, and is 0.018 mm.

The parameters of the lenses of the first embodiment are listed in Table 1 and Table 2.

TABLE 1 f = 3.03968 mm; f/HEP = 1.6; HAF = 50.0010 deg

| Surface | Radius of curvature (mm) | Thickness (mm) | Material | Refractive index | Abbe number | Focal length (mm) |
|---|---|---|---|---|---|---|
| 0 | Object plane | infinity | | | | |
| 1 | 1st lens 4.01438621 | 0.750 | plastic | 1.514 | 56.80 | −9.24529 |
| 2 | 2.040696375 | 3.602 | | | | |
| 3 | Aperture plane | −0.412 | | | | |
| 4 | 2nd lens 2.45222384 | 0.895 | plastic | 1.565 | 58.00 | 6.33819 |
| 5 | 6.705898264 | 0.561 | | | | |
| 6 | 3rd lens 16.39663088 | 0.932 | plastic | 1.565 | 58.00 | 7.93877 |
| 7 | −6.073735083 | 0.656 | | | | |
| 8 | 4th lens 4.421363446 | 1.816 | plastic | 1.565 | 58.00 | 3.02394 |
| 9 | −2.382933539 | 0.405 | | | | |
| 10 | 5th lens −1.646639396 | 0.645 | plastic | 1.650 | 21.40 | −2.32439 |
| 11 | 23.53222697 | 0.100 | | | | |
| 12 | Infrared rays filter plane | 0.200 | BK7_SCH | 1.517 | 64.20 | |
| 13 | plane | 0.412 | | | | |
| 14 | Image plane plane | | | | | |

Reference wavelength: 555 nm.

TABLE 2

Coefficients of the aspheric surfaces

| Surface | 1 | 2 | 4 | 5 | 6 |
|---|---|---|---|---|---|
| k | −1.882119E−01 | −1.927558E+00 | −6.483417E+00 | 1.766123E+01 | −5.000000E+01 |
| A4 | 7.686381E−04 | 3.070422E−02 | 5.439775E−02 | 7.241691E−03 | −2.985209E−02 |
| A6 | 4.630306E−04 | −3.565153E−03 | −7.980567E−03 | −8.359563E−03 | −7.175713E−03 |
| A8 | 3.178966E−05 | 2.062259E−03 | −3.537039E−04 | 1.303430E−02 | 4.284107E−03 |
| A10 | −1.773597E−05 | −1.571117E−04 | 2.844845E−03 | −6.951350E−03 | −5.492349E−03 |
| A12 | 1.620619E−06 | −4.694004E−05 | −1.025049E−03 | 1.366262E−03 | 1.232072E−03 |
| A14 | −4.916041E−08 | 7.399980E−06 | 1.913679E−04 | 3.588298E−04 | −4.107269E−04 |
| A16 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

| Surface | 7 | 8 | 8 | 9 | 10 |
|---|---|---|---|---|---|
| k | −3.544648E+01 | −3.167522E+01 | −2.470764E+00 | −1.570351E+00 | 4.928899E+01 |
| A4 | −6.315366E−02 | −1.903506E−03 | −2.346908E−04 | −4.250059E−04 | −4.625703E−03 |
| A6 | 6.038040E−03 | −1.806837E−03 | 2.481207E−03 | −1.591781E−04 | −7.108872E−04 |
| A8 | 4.674156E−03 | −1.670351E−03 | −5.862277E−04 | −3.752177E−05 | 3.429244E−05 |
| A10 | −8.031117E−03 | 4.791024E−04 | −1.955029E−04 | −9.210114E−05 | 2.887298E−06 |
| A12 | 3.319791E−03 | −5.594125E−05 | 1.880941E−05 | −1.101797E−05 | 3.684628E−07 |
| A14 | −5.356799E−04 | 3.704401E−07 | 1.132586E−06 | 3.536320E−06 | −4.741322E−08 |
| A16 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

The figures related to the profile curve lengths obtained based on Table 1 and Table 2 are listed in the following table:

First embodiment (Reference wavelength: 555 nm)

| ARE | 1/2(HEP) | ARE value | ARE−1/2(HEP) | 2(ARE/HEP) % | TP | ARE/TP (%) |
|---|---|---|---|---|---|---|
| 11 | 0.950 | 0.958 | 0.008 | 100.87% | 0.750 | 127.69% |
| 12 | 0.950 | 0.987 | 0.037 | 103.91% | 0.750 | 131.53% |
| 21 | 0.950 | 0.976 | 0.026 | 102.74% | 0.895 | 108.99% |
| 22 | 0.950 | 0.954 | 0.004 | 100.42% | 0.895 | 106.52% |
| 31 | 0.950 | 0.949 | −0.001 | 99.94% | 0.932 | 101.83% |
| 32 | 0.950 | 0.959 | 0.009 | 100.93% | 0.932 | 102.84% |
| 41 | 0.950 | 0.953 | 0.003 | 100.29% | 1.816 | 52.45% |
| 42 | 0.950 | 0.970 | 0.020 | 102.15% | 1.816 | 53.42% |
| 51 | 0.950 | 0.995 | 0.045 | 104.71% | 0.645 | 154.24% |
| 52 | 0.950 | 0.949 | −0.001 | 99.92% | 0.645 | 147.18% |

First embodiment (Reference wavelength: 555 nm)

| ARS | EHD | ARS value | ARS−EHD | (ARS/EHD) % | TP | ARS/TP (%) |
|---|---|---|---|---|---|---|
| 11 | 3.459 | 4.210 | 0.751 | 121.71% | 0.750 | 561.03% |
| 12 | 2.319 | 3.483 | 1.165 | 150.24% | 0.750 | 464.19% |
| 21 | 1.301 | 1.384 | 0.084 | 106.43% | 0.895 | 154.61% |
| 22 | 1.293 | 1.317 | 0.024 | 101.87% | 0.895 | 147.09% |
| 31 | 1.400 | 1.447 | 0.047 | 103.39% | 0.932 | 155.22% |
| 32 | 1.677 | 1.962 | 0.285 | 116.97% | 0.932 | 210.45% |
| 41 | 2.040 | 2.097 | 0.057 | 102.82% | 1.816 | 115.48% |
| 42 | 2.338 | 2.821 | 0.483 | 120.67% | 1.816 | 155.32% |
| 51 | 2.331 | 2.971 | 0.639 | 127.43% | 0.645 | 460.64% |
| 52 | 3.219 | 3.267 | 0.049 | 101.51% | 0.645 | 506.66% |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
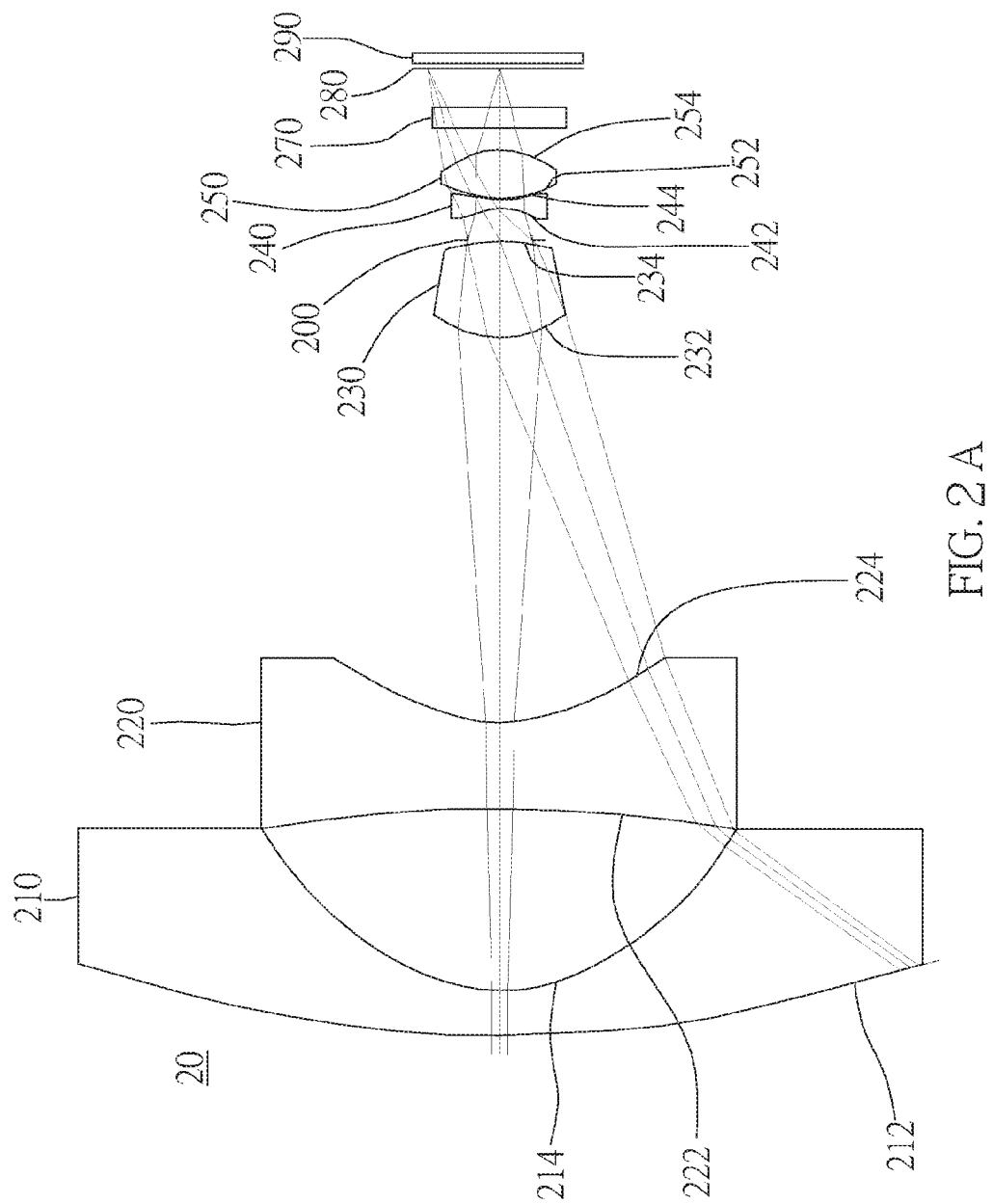
FIG. 2A is a schematic diagram of a second embodiment of the present invention.
Figure 2:
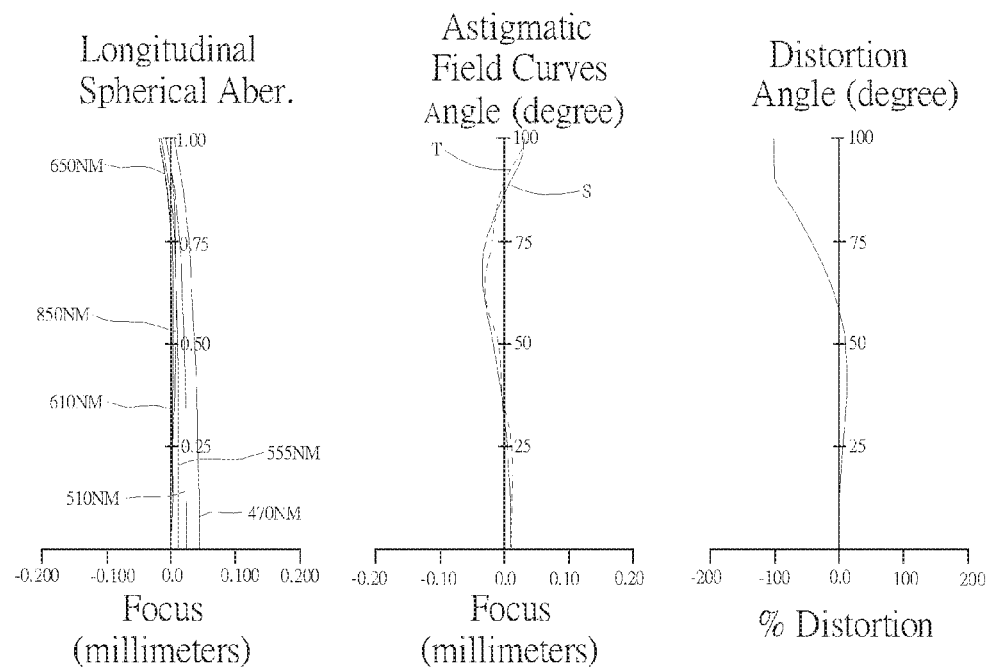
FIG. 2B shows curve diagrams of longitudinal spherical aberration, astigmatic field, and optical distortion of the optical image capturing system in the order from left to right of the second embodiment of the present application.
FIG. 2C shows a tangential fan and a sagittal fan of the optical image capturing system of the second embodiment of the present application, and a transverse aberration diagram at 0.7 field of view when a longest operation wavelength and a shortest operation wavelength pass through an edge of an aperture.
Figure 2:
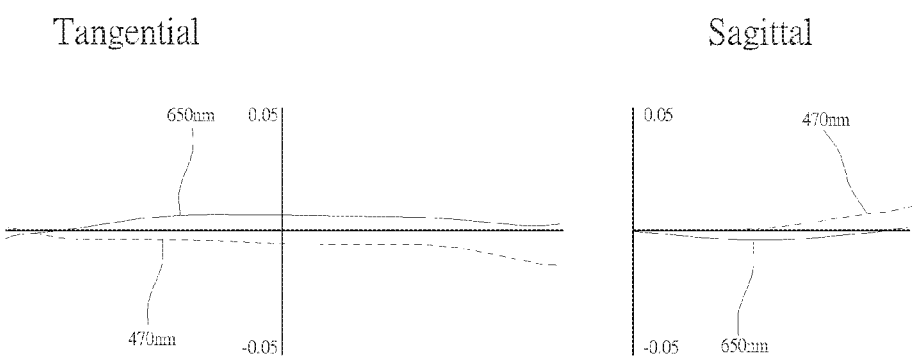

As shown in FIG. 2A and FIG. 2B, an optical image capturing system 20 of the second embodiment of the present invention includes, along an optical axis from an object side to an image side, a first lens 210, a second lens 220, a third lens 230, an aperture 200, a fourth lens 240, a fifth lens 250, an infrared rays filter 280, an image plane 290, and an image sensor 292. FIG. 2C is a transverse aberration diagram at 0.7 field of view of the second embodiment of the present application.

The first lens 210 has negative refractive power and is made of plastic. An object-side surface 212 thereof, which faces the object side, is a convex aspheric surface, and an image-side surface 214 thereof, which faces the image side, is a concave aspheric surface. The object-side surface 212 has an inflection point.

The second lens 220 has negative refractive power and is made of plastic. An object-side surface 222 thereof, which faces the object side, is a concave aspheric surface, and an image-side surface 224 thereof, which faces the image side, is a concave aspheric surface. The object-side surface 222 has an inflection point.

The third lens 230 has positive refractive power and is made of plastic. An object-side surface 232, which faces the object side, is a convex aspheric surface, and an image-side surface 234, which faces the image side, is a convex aspheric surface.

The fourth lens 240 has negative refractive power and is made of plastic. An object-side surface 242, which faces the object side, is a concave aspheric surface, and an image-side surface 244, which faces the image side, is a concave aspheric surface. The image-side surface 244 has an inflection point.

The fifth lens 250 has positive refractive power and is made of plastic. An object-side surface 252, which faces the object side, is a convex surface, and an image-side surface 254, which faces the image side, is a convex surface. It may help to shorten the back focal length to keep small in size. In addition, the image-side surface 254 both has an inflection point, which may reduce an incident angle of the light of an off-axis field of view and correct the aberration of the off-axis field of view.

The infrared rays filter 280 is made of glass and between the fifth lens 250 and the image plane 290. The infrared rays filter 280 gives no contribution to the focal length of the system.

The optical image capturing system of the second embodiment satisfies |f2|+|f3|+|f4|=21.3374 mm; |f1|+|f5|=18.3654 mm; and |f2|+|f3|+|f4|>|f1|+|f5|, where f1 is a focal length of the first lens 210, f2 is a focal length of the second lens 220, f3 is a focal length of the third lens 230, f4 is a focal length of the fourth lens 240, and f5 is a focal length of the fifth lens 250.

In the second embodiment, the optical image capturing system of the second embodiment further satisfies ΣPP=8.87594 mm; and f3/ΣPP=0.67791, where ΣPP is a sum of the focal lengths of each positive lens. It is helpful to share the positive refractive power of the third lens 230 to the other positive lens to avoid the significant aberration caused by the incident rays.

The optical image capturing system of the second embodiment further satisfies ΣNP=−30.82683 mm; and f1/ΣNP=0.50302, where ΣNP is a sum of the focal lengths of each negative lens. It is helpful to share the negative refractive power of the first lens 210 to other negative lenses.

The parameters of the lenses of the second embodiment are listed in Table 3 and Table 4.

TABLE 3 f = 1.33168 mm; f/HEP = 1.8; HAF = 100 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1st lens | 57.51654 | 2.017047 | plastic | 1.565 | 58 | −15.5065 |
| 2 | | 7.52712 | 8.271781 | | | | |
| 3 | 2nd lens | −60.0917 | 4.001031 | plastic | 1.565 | 58 | −12.6711 |
| 4 | | 8.35303 | 17.47607 | | | | |
| 5 | 3rd lens | 4.38824 | 4.366001 | plastic | 1.55 | 56.5 | 6.01708 |
| 6 | | −8.81439 | 0.05 | | | | |
| 7 | Aperture | plane | 1.453606 | | | | |
| 8 | 4th lens | −3.58683 | 0.4 | plastic | 1.65 | 21.4 | −2.64923 |
| 9 | | 3.5145 | 0.110454 | | | | |
| 10 | 5th lens | 2.99373 | 2.211261 | plastic | 1.565 | 58 | 2.85886 |
| 11 | | −2.5883 | 1 | | | | |
| 12 | Infrared rays filter | plane | 0.85 | NBK7 | | | |
| 13 | | plane | 1.843675 | | | | |
| 14 | Image plane | plane | | | | | |

Reference wavelength: 555 nm.

TABLE 4

| Coefficients of the aspheric surfaces | | | | | |
|---|---|---|---|---|---|
| Surface | 1 | 2 | 3 | 4 | 5 |
| k | 4.064015 | −0.541688 | −2.11709 | −0.405219 | −1.15074 |
| A4 | 4.29560E−06 | −2.71683E−04 | 9.35290E−06 | −1.84133E−04 | 1.07769E−03 |
| A6 | −1.71152E−08 | −1.07076E−07 | −6.60979E−08 | −2.20024E−06 | −3.81712E−05 |
| A8 | −2.76748E−11 | 2.06773E−11 | −4.90235E−10 | −2.29752E−08 | 6.79373E−06 |
| A10 | 4.72903E−14 | −5.18719E−14 | −3.19862E−12 | 1.24733E−10 | −6.94540E−07 |
| A12 | −1.44839E−17 | 1.35603E−13 | −2.50917E−15 | 2.60744E−12 | 1.21782E−13 |
| A14 | −6.89749E−20 | −3.71107E−15 | 4.18487E−16 | 6.29943E−15 | 2.30237E−16 |
| Surface | 6 | 8 | 9 | 10 | 11 |
| k | 12.263053 | −10.261077 | −18.845912 | −15.130709 | −1.072172 |
| A4 | 5.53057E−03 | −1.76548E−02 | 7.36539E−03 | 4.48813E−03 | 2.76592E−03 |
| A6 | −2.21158E−04 | −1.86828E−03 | −3.74230E−03 | −6.88623E−04 | −3.84611E−06 |
| A8 | −5.14730E−05 | 1.06128E−03 | 6.37415E−04 | 9.17362E−05 | 5.19716E−05 |
| A10 | 2.27442E−05 | −1.81264E−04 | −5.53223E−05 | −3.42556E−06 | 5.54782E−06 |
| A12 | 1.21783E−13 | 1.21783E−13 | 1.21783E−13 | 1.21783E−13 | 1.21754E−13 |
| A14 | 2.30285E−16 | 2.30324E−16 | 2.30289E−16 | 2.30301E−16 | 2.30386E−16 |

An equation of the aspheric surfaces of the second embodiment is the same as that of the first embodiment, and the definitions are the same as well.

The exact parameters of the second embodiment based on Table 3 and Table 4 are listed in the following table:

| Second embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f1/f2 \| |
| 0.08588 | 0.10510 | 0.22132 | 0.50267 | 0.46581 | 1.22377 |
| ΣPPR | ΣNPR | ΣPPR/\|ΣNPR\| | IN12/f | IN45/f | \| f2/f3 \| |
| 0.68712 | 0.69364 | 0.99060 | 6.21154 | 0.08294 | 2.10586 |
| TP3/(IN23 + TP3 + IN34) | | (TP1 + IN12)/TP2 | | (TP5 + IN45)/TP4 | |
| 0.18702 | | 2.57155 | | 5.80429 | |
| HOS | InTL | HOS/HOI | InS/HOS | ODT % | TDT % |
| 44.04140 | 40.35730 | 13.55746 | 0.17846 | −141.731 | 148.358 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| TP2/TP3 | TP3/TP4 | InRS51 | InRS52 | \| InRS51 \|/TP5 | \| InRS52 \|/TP5 |
| 0.91641 | 10.91500 | 0.549456 | −0.95495 | 0.24848 | 0.43186 |
| PLTA | PSTA | NLTA | NSTA | SLTA | SSTA |
| −0.019 mm | 0.003 mm | 0.004 mm | −0.008 mm | 0.010 mm | 0.002 mm |

The figures related to the profile curve lengths obtained based on Table 3 and Table 4 are listed in the following table:

| Second embodiment (Reference wavelength: 555 nm) | | | | | |
|---|---|---|---|---|---|
| ARE | 1/2(HEP) | ARE value | ARE−1/2(HEP) | 2(ARE/HEP) % | TP | ARE/TP (%) |
| 11 | 0.370 | 0.369 | −0.00091 | 99.75% | 2.017 | 18.29% |
| 12 | 0.370 | 0.369 | −0.00076 | 99.79% | 2.017 | 18.30% |
| 21 | 0.370 | 0.369 | −0.00091 | 99.75% | 4.001 | 9.22% |
| 22 | 0.370 | 0.369 | −0.00079 | 99.79% | 4.001 | 9.23% |
| 31 | 0.370 | 0.369 | −0.00048 | 99.87% | 4.366 | 8.46% |
| 32 | 0.370 | 0.369 | −0.00081 | 99.78% | 4.366 | 8.45% |
| 41 | 0.370 | 0.370 | −0.00027 | 99.93% | 0.400 | 92.41% |
| 42 | 0.370 | 0.370 | −0.00030 | 99.92% | 0.400 | 92.40% |
| 51 | 0.370 | 0.370 | −0.00008 | 99.98% | 2.211 | 16.73% |
| 52 | 0.370 | 0.370 | 0.00033 | 100.09% | 2.211 | 16.74% |

| Second embodiment (Reference wavelength: 555 nm) | | | | | | |
|---|---|---|---|---|---|---|
| ARS | EHD | ARS value | ARS−EHD | (ARS/EHD) % | TP | ARS/TP (%) |
| 11 | 18.475 | 18.834 | 0.358 | 101.94% | 2.017 | 933.72% |
| 12 | 10.526 | 13.912 | 3.385 | 132.16% | 2.017 | 689.71% |
| 21 | 10.297 | 10.360 | 0.064 | 100.62% | 4.001 | 258.94% |
| 22 | 7.320 | 7.932 | 0.613 | 108.37% | 4.001 | 198.25% |
| 31 | 2.964 | 3.195 | 0.232 | 107.82% | 4.366 | 73.19% |
| 32 | 1.644 | 1.651 | 0.007 | 100.42% | 4.366 | 37.81% |
| 41 | 1.667 | 1.740 | 0.074 | 104.41% | 0.400 | 435.05% |
| 42 | 2.078 | 2.103 | 0.025 | 101.22% | 0.400 | 525.72% |
| 51 | 2.340 | 2.411 | 0.070 | 103.00% | 2.211 | 109.02% |
| 52 | 2.491 | 2.698 | 0.207 | 108.29% | 2.211 | 122.00% |

The results of the equations of the second embodiment based on Table 3 and Table 4 are listed in the following table:

Values related to the inflection points of the second embodiment
(Reference wavelength: 555 nm)

| | | | | | | | |
|---|---|---|---|---|---|---|---|
| HIF111 | 16.3905 | HIF111/HOI | 5.04556 | SGI111 | 2.53067 | \|SGI111\|/(\|SGI111\| + TP1) | 0.55647 |
| HIF211 | 10.1609 | HIF211/HOI | 3.12787 | SGI211 | −0.86928 | \|SGI211\|/(\|SGI211\| + TP2) | 0.17849 |
| HIF421 | 1.31733 | HIF421/HOI | 0.40552 | SGI421 | 0.17941 | \|SGI421\|/(\|SGI421\| + TP4) | 0.30965 |
| HIF521 | 1.92575 | HIF521/HOI | 0.59281 | SGI521 | −0.65782 | \|SGI521\|/(\|SGI521\| + TP5) | 0.22928 |

Third Embodiment

Figure 3A:
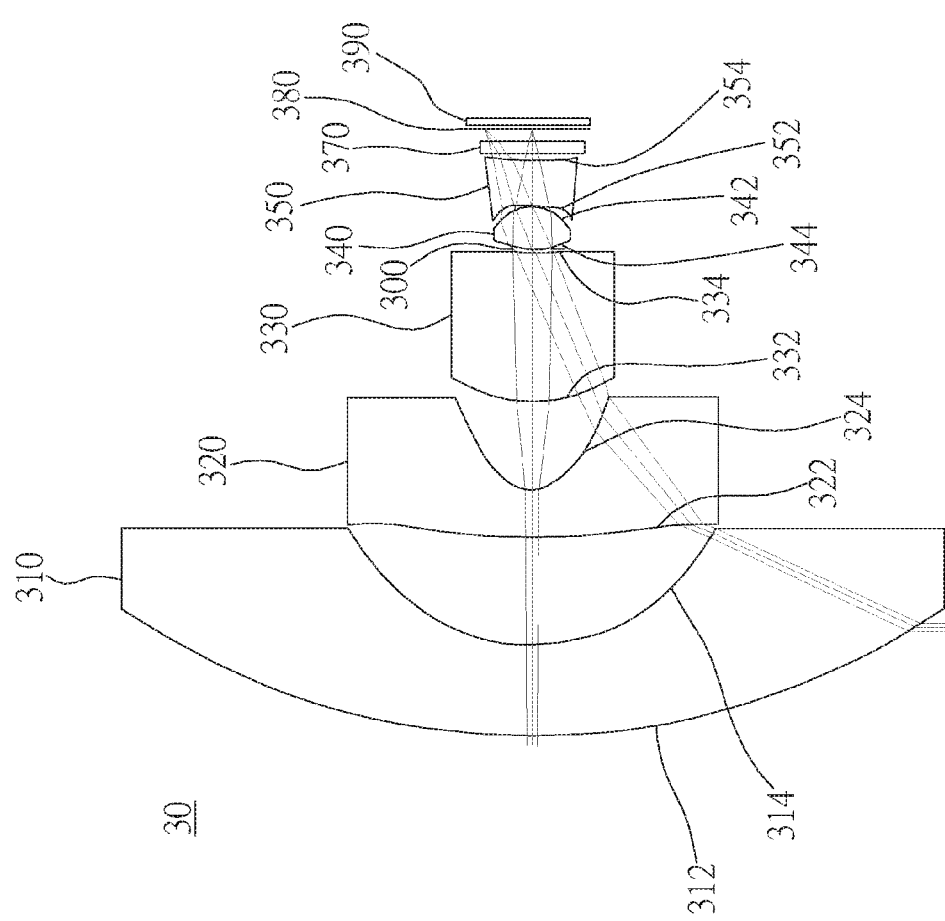
FIG. 3A is a schematic diagram of a third embodiment of the present invention.
Figure 3:
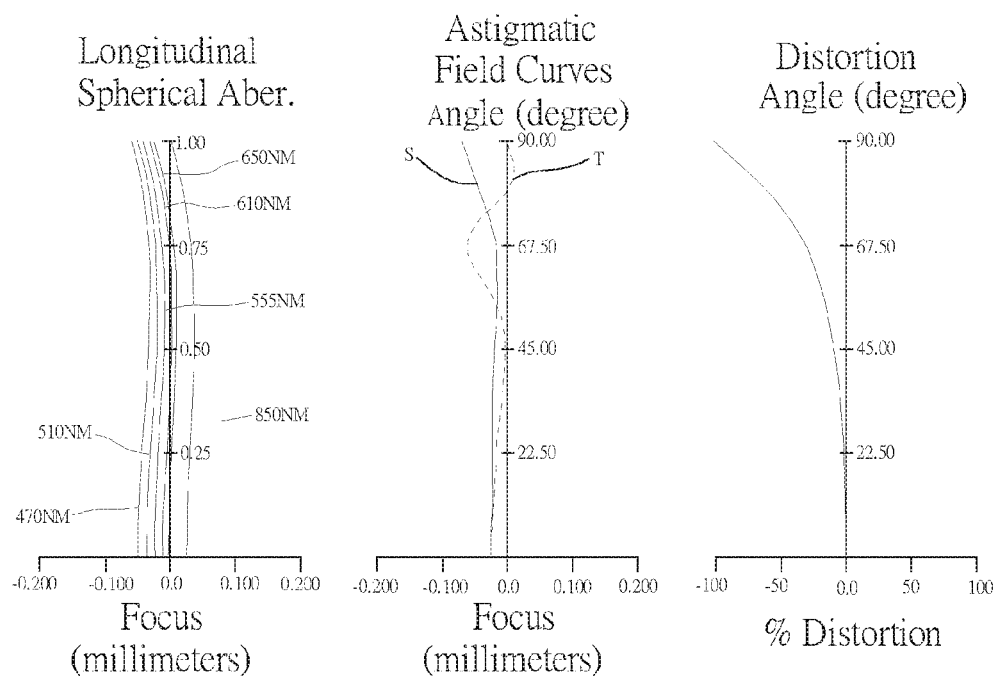
FIG. 3B shows curve diagrams of longitudinal spherical aberration, astigmatic field, and optical distortion of the optical image capturing system in the order from left to right of the third embodiment of the present application.
FIG. 3C shows a tangential fan and a sagittal fan of the optical image capturing system of the third embodiment of the present application, and a transverse aberration diagram at 0.7 field of view when a longest operation wavelength and a shortest operation wavelength pass through an edge of an aperture.
Figure 3:
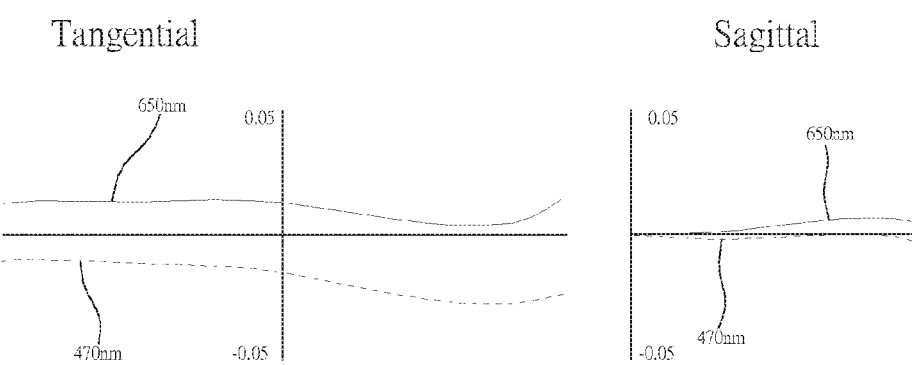

As shown in FIG. 3A and FIG. 3B, an optical image capturing system of the third embodiment of the present invention includes, along an optical axis from an object side to an image side, a first lens 310, a second lens 320, a third lens 330, an aperture 300, a fourth lens 340, a fifth lens 350, an infrared rays filter 380, an image plane 390, and an image sensor 392. FIG. 3C is a transverse aberration diagram at 0.7 field of view of the third embodiment of the present application.

The first lens 310 has negative refractive power and is made of plastic. An object-side surface 312 thereof, which faces the object side, is a convex aspheric surface, and an image-side surface 314 thereof, which faces the image side, is a concave aspheric surface.

The second lens 320 has negative refractive power and is made of plastic. An object-side surface 322 thereof, which faces the object side, is a convex aspheric surface, and an image-side surface 324 thereof, which faces the image side, is a concave aspheric surface. The object-side surface 322 has an inflection point.

The third lens 330 has positive refractive power and is made of plastic. An object-side surface 332 thereof, which faces the object side, is a convex surface, and an image-side surface 334 thereof, which faces the image side, is a concave aspheric surface.

The fourth lens 340 has positive refractive power and is made of plastic. An object-side surface 342, which faces the object side, is a convex aspheric surface, and an image-side surface 344, which faces the image side, is a convex aspheric surface. The object-side surface 342 has an inflection point.

The fifth lens 350 has negative refractive power and is made of plastic. An object-side surface 352, which faces the object side, is a convex surface, and an image-side surface 354, which faces the image side, is a concave surface. It may help to shorten the back focal length to keep small in size. In addition, the object-side surface 352 has two inflection points, and the image-side surface 354 has an inflection point, which may reduce an incident angle of the light of an off-axis field of view and correct the aberration of the off-axis field of view.

The infrared rays filter 380 is made of glass and between the fifth lens 350 and the image plane 390. The infrared rays filter 390 gives no contribution to the focal length of the system.

The optical image capturing system of the second embodiment satisfies $|f2|+|f3|+|f4|=32.8735$; $|f1|+|f5|=50.1732$ mm; and $|f2|+|f3|+|f4|<|f1|+|f5|$, where f1 is a focal length of the first lens 310, f2 is a focal length of the second lens 320, f3 is a focal length of the third lens 330, f4 is a focal length of the fourth lens 340, and f5 is a focal length of the fifth lens 350.

In the third embodiment, the optical image capturing system of the third embodiment further satisfies $\Sigma PP=27.87392$ mm; and $f3/\Sigma PP=0.87453$ mm, where $\Sigma PP$ is a sum of the focal lengths of each positive lens. It is helpful to share the positive refractive power of the third lens 330 to the other positive lens to avoid the significant aberration caused by the incident rays.

The optical image capturing system of the third embodiment further satisfies $\Sigma NP=-55.17274$ mm; and $f1/\Sigma NP=0.61045$, where $\Sigma NP$ is a sum of the focal lengths of each negative lens. It is helpful to share the negative refractive power of the first lens 310 to other negative lenses.

The parameters of the lenses of the third embodiment are listed in Table 5 and Table 6.

TABLE 5 f = 1.35300 mm; f/HEP = 1.8; HAF = 89.9935 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1$^{st}$ lens | 49.63375 | 6.170876 | plastic | 1.565 | 58 | −33.6801 |
| 2 | | 13.16671 | 7.280717 | | | | |
| 3 | 2$^{nd}$ lens | 51.25803 | 3.299971 | plastic | 1.535 | 56.3 | −4.99954 |
| 4 | | 2.4926 | 6.054966 | | | | |
| 5 | 3$^{rd}$ lens | 9.21507 | 10 | plastic | 1.65 | 21.4 | 24.3765 |
| 6 | | 12.41776 | 0.26997 | | | | |
| 7 | Aperture | plane | 0 | | | | |
| 8 | 4$^{th}$ lens | 3.84092 | 2.886463 | plastic | 1.565 | 58 | 3.49742 |
| 9 | | −2.98276 | 0.05 | | | | |
| 10 | 5$^{th}$ lens | 83.58868 | 3.093074 | plastic | 1.65 | 21.4 | −16.4931 |
| 11 | | 9.43212 | 0.5 | | | | |
| 12 | Infrared rays filter | plane | 0.85 | | 1.517 | 64.13 | |
| 13 | | plane | 0.765964 | | | | |
| 14 | Image plane | plane | | | | | |

Reference wavelength: 555 nm.

TABLE 6

Coefficients of the aspheric surfaces

| | Surface | | | | |
|---|---|---|---|---|---|
| | 1 | 2 | 3 | 4 | 5 |
| k | 0 | 0 | 9.969201 | −0.824227 | −2.43075 |
| A4 | | 1.94756E−20 | 4.68977E−05 | −6.15481E−04 | 2.12823E−04 |
| A6 | | 2.53134E−37 | −4.92765E−07 | 6.35197E−06 | 2.12615E−06 |
| A8 | | 0.00000E+00 | −3.49547E−09 | 7.53165E−08 | 1.30474E−07 |
| A10 | | 0.00000E+00 | −8.67461E−12 | −6.18924E−10 | −7.98482E−10 |
| A12 | | 2.73003E−14 | 4.03535E−13 | −2.34914E−09 | −3.41240E−10 |
| A14 | | −6.66915E−16 | −1.45720E−15 | 2.94267E−12 | −5.37050E−13 |

| | Surface | | | | |
|---|---|---|---|---|---|
| | 6 | 8 | 9 | 10 | 11 |
| k | 45.300665 | −0.797324 | 0 | 44.089874 | −0.224934 |
| A4 | 1.64567E−03 | −1.60862E−03 | 5.99395E−16 | −8.32874E−03 | 1.82396E−03 |
| A6 | −1.98445E−04 | 3.97482E−04 | 4.47827E−24 | −5.53577E−04 | −6.81997E−04 |
| A8 | 1.28754E−04 | −2.22951E−04 | 0.00000E+00 | −4.84292E−05 | 4.79287E−05 |
| A10 | −1.21974E−05 | 7.73063E−06 | 0.00000E+00 | −2.32327E−05 | 5.33395E−07 |
| A12 | 2.20435E−09 | 9.20194E−18 | −9.14115E−18 | −4.61660E−07 | −3.37863E−07 |
| A14 | −4.23398E−13 | −1.56560E−17 | 8.21220E−18 | 1.03426E−08 | 1.49915E−08 |

An equation of the aspheric surfaces of the third embodiment is the same as that of the first embodiment, and the definitions are the same as well.

The exact parameters of the third embodiment based on Table 5 and Table 6 are listed in the following table:

| Third embodiment (Reference wavelength: 555 nm) | | | | | |
|---|---|---|---|---|---|
| \| f/f1 \| | \| f/f2 \| | \| f/f3 \| | \| f/f4 \| | \| f/f5 \| | \| f1/f2 \| |
| 0.04017 | 0.27062 | 0.05550 | 0.38686 | 0.08203 | 6.73664 |
| ΣPPR | ΣNPR | ΣPPR/\|ΣNPR\| | IN12/f | IN45/f | \| f2/f3 \| |
| 0.44236 | 0.39283 | 1.12608 | 5.38117 | 0.03695 | 0.20510 |
| TP3/(IN23 + TP3 + IN34) | | (TP1 + IN12)/TP2 | | (TP5 + IN45)/TP4 | |
| 0.61256 | | 4.07628 | | 1.08890 | |
| HOS | InTL | HOS/HOI | InS/HOS | ODT % | TDT % |
| 41.22200 | 39.10600 | 12.68369 | 0.19760 | −100.027 | 77.9207 |
| HVT41 | HVT42 | HVT51 | HVT52 | HVT52/HOI | HVT52/HOS |
| 0.00000 | 0.00000 | 0.58896 | 0.00000 | 0.18122 | 0.01429 |
| TP2/TP3 | TP3/TP4 | InRS51 | InRS52 | \| InRS51 \|/TP5 | \| InRS52 \|/TP5 |
| 0.33000 | 3.46445 | −0.049915 | 0.243398 | 0.01614 | 0.07869 |
| PLTA | PSTA | NLTA | NSTA | SLTA | SSTA |
| −0.024 mm | 0.017 mm | −0.018 mm | 0.020 mm | −0.003 mm | 0.005 mm |

The figures related to the profile curve lengths obtained based on Table 5 and Table 6 are listed in the following table:

| Third embodiment (Reference wavelength: 555 nm) | | | | | | |
|---|---|---|---|---|---|---|
| ARE | 1/2(HEP) | ARE value | ARE−1/2(HEP) | 2(ARE/HEP) % | TP | ARE/TP (%) |
| 11 | 0.376 | 0.375 | −0.00083 | 99.78% | 6.171 | 6.08% |
| 12 | 0.376 | 0.375 | −0.00078 | 99.79% | 6.171 | 6.08% |
| 21 | 0.376 | 0.375 | −0.00083 | 99.78% | 3.300 | 11.36% |
| 22 | 0.376 | 0.376 | 0.00058 | 100.15% | 3.300 | 11.41% |
| 31 | 0.376 | 0.375 | −0.00073 | 99.81% | 10.000 | 3.75% |
| 32 | 0.376 | 0.375 | −0.00077 | 99.79% | 10.000 | 3.75% |
| 41 | 0.376 | 0.376 | −0.00024 | 99.94% | 2.886 | 13.01% |
| 42 | 0.376 | 0.376 | 0.00016 | 100.04% | 2.886 | 13.03% |
| 51 | 0.376 | 0.375 | −0.00083 | 99.78% | 3.093 | 12.12% |
| 52 | 0.376 | 0.375 | −0.00073 | 99.81% | 3.093 | 12.13% |

| Third embodiment (Reference wavelength: 555 nm) | | | | | | |
|---|---|---|---|---|---|---|
| ARS | EHD | ARS value | ARS−EHD | (ARS/EHD) % | TP | ARS/TP (%) |
| 11 | 25.750 | 27.073 | 1.322 | 105.13% | 6.171 | 438.72% |
| 12 | 12.259 | 16.061 | 3.802 | 131.02% | 6.171 | 260.28% |
| 21 | 10.518 | 10.617 | 0.099 | 100.94% | 3.300 | 321.72% |
| 22 | 4.763 | 7.395 | 2.632 | 155.27% | 3.300 | 224.10% |
| 31 | 4.233 | 4.384 | 0.150 | 103.55% | 10.000 | 43.84% |
| 32 | 1.358 | 1.363 | 0.004 | 100.33% | 10.000 | 13.63% |
| 41 | 1.596 | 1.638 | 0.041 | 102.59% | 2.886 | 56.74% |
| 42 | 2.047 | 2.256 | 0.209 | 110.20% | 2.886 | 78.16% |
| 51 | 1.976 | 1.997 | 0.021 | 101.06% | 3.093 | 64.55% |
| 52 | 2.446 | 2.468 | 0.022 | 100.90% | 3.093 | 79.80% |

The results of the equations of the third embodiment based on Table 5 and
Table 6 are listed in the following table:

object side, is a concave aspheric surface, and an image-side surface 444, which faces the image side, is a concave aspheric surface.

| Values related to the inflection points of the third embodiment (Reference wavelength: 555 nm) | | | | | | | |
|---|---|---|---|---|---|---|---|
| HIF211 | 7.17352 | HIF211/HOI | 2.20724 | SGI211 | 0.56778 | \|SGI211\|/(\|SGI211\| + TP2) | 0.14680 |
| HIF411 | 0.79077 | HIF411/HOI | 0.24331 | SGI411 | −0.35438 | \|SGI411\|/(\|SGI411\| + TP4) | 0.10935 |
| HIF511 | 0.34272 | HIF511/HOI | 0.10545 | SGI511 | 0.00059 | \|SGI511\|/(\|SGI511\| + TP5) | 0.00019 |
| HIF512 | 1.82902 | HIF512/HOI | 0.56278 | SGI512 | 0.28955 | \|SGI512\|/(\|SGI512\| + TP5) | 0.08560 |
| HIF521 | 2.12924 | HIF521/HOI | 0.65515 | SGI521 | 0.23562 | \|SGI521\|/(\|SGI521\| + TP5) | 0.07078 |

Fourth Embodiment

Figure 4:
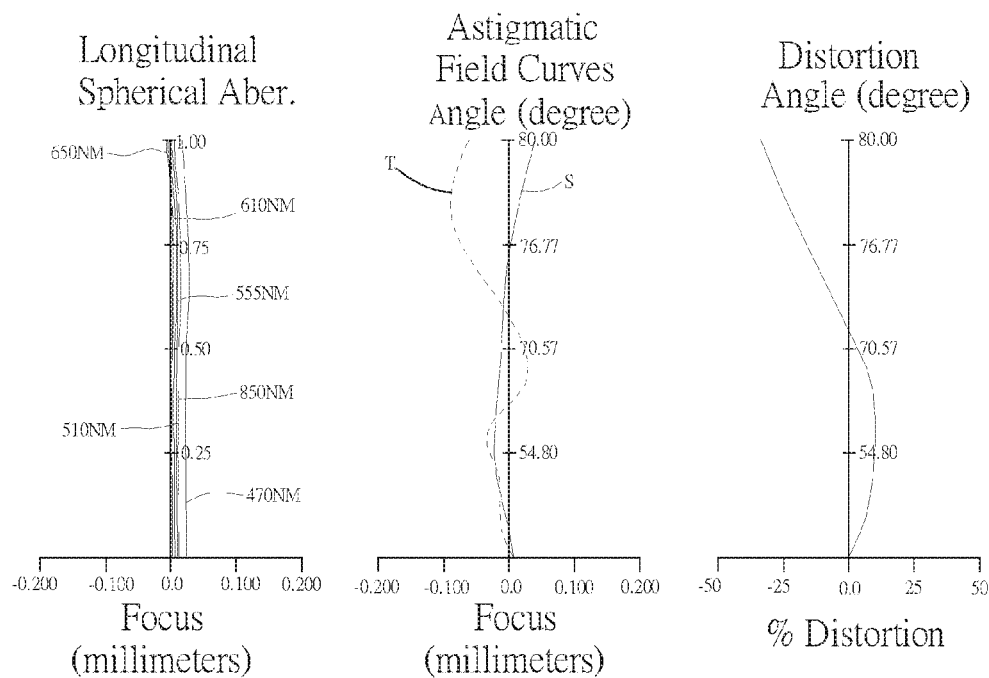
FIG. 4A is a schematic diagram of a fourth embodiment of the present invention.
FIG. 4B shows curve diagrams of longitudinal spherical aberration, astigmatic field, and optical distortion of the optical image capturing system in the order from left to right of the fourth embodiment of the present application.
FIG. 4C shows a tangential fan and a sagittal fan of the optical image capturing system of the fourth embodiment of the present application, and a transverse aberration diagram at 0.7 field of view when a longest operation wavelength and a shortest operation wavelength pass through an edge of an aperture.
Figure 4:
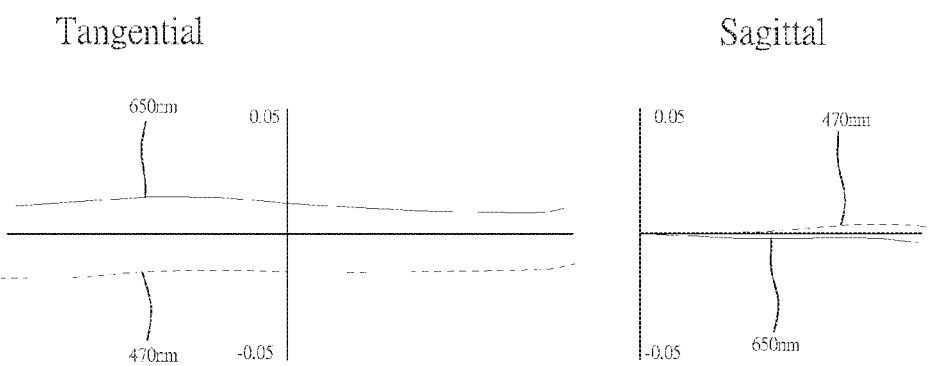

As shown in FIG. 4A and FIG. 4B, an optical image capturing system 40 of the fourth embodiment of the present invention includes, along an optical axis from an object side to an image side, a first lens 410, an aperture 400, a second lens 420, a third lens 430, a fourth lens 440, a fifth lens 450, an infrared rays filter 480, an image plane 490, and an image sensor 492. FIG. 4C is a transverse aberration diagram at 0.7 field of view of the fourth embodiment of the present application.

The first lens 410 has negative refractive power and is made of plastic. An object-side surface 412 thereof, which faces the object side, is a convex aspheric surface, and an image-side surface 414 thereof, which faces the image side, is a concave aspheric surface.

The second lens 420 has negative refractive power and is made of plastic. An object-side surface 422 thereof, which faces the object side, is a convex aspheric surface, and an image-side surface 424 thereof, which faces the image side, is a concave aspheric surface. The object-side surface 422 and the image-side surface 424 both have an inflection point.

The third lens 430 has positive refractive power and is made of plastic. An object-side surface 432 thereof, which faces the object side, is a convex aspheric surface, and an image-side surface 434 thereof, which faces the image side, is a convex aspheric surface. The object-side surface 432 has an inflection point.

The fourth lens 440 has negative refractive power and is made of plastic. An object-side surface 442, which faces the The fifth lens 450 has positive refractive power and is made of plastic. An object-side surface 452, which faces the object side, is a convex surface, and an image-side surface 454, which faces the image side, is a convex surface. It may help to shorten the back focal length to keep small in size.

The infrared rays filter 480 is made of glass and between the fifth lens 450 and the image plane 490. The infrared rays filter 480 gives no contribution to the focal length of the system.

The optical image capturing system of the second embodiment satisfies $|f2|+|f3|+|f4|=24.2854$ mm; $|f1|+|f5|=12.5933$ mm; and $|f2|+|f3|+|f4|>|f1|+|f5|$, where f1 is a focal length of the first lens 410, f2 is a focal length of the second lens 420, f3 is a focal length of the third lens 430, f4 is a focal length of the fourth lens 440, and f5 is a focal length of the fifth lens 450.

In the fourth embodiment, the optical image capturing system of the fourth embodiment further satisfies $\Sigma PP=15.68241$ mm; and $f3/\Sigma PP=0.84738$, where $\Sigma PP$ is a sum of the focal lengths of each positive lens. It is helpful to share the positive refractive power of the third lens 430 to the other positive lens to avoid the significant aberration caused by the incident rays.

The optical image capturing system of the fourth embodiment further satisfies $\Sigma NP=-33.93998$ mm; and $f1/\Sigma NP=0.42508$, where $\Sigma NP$ is a sum of the focal lengths of each negative lens. It is helpful to share the negative refractive power of the first lens 410 to other negative lenses.

The parameters of the lenses of the fourth embodiment are listed in Table 7 and Table 8.

TABLE 7 f = 0.85370 mm; f/HEP = 1.8; HAF = 80.0032 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1st lens | 56.69581 | 8 | plastic | 1.565 | 58 | −8.80866 |
| 2 | | 4.3543 | 17.07889 | | | | |
| 3 | 2nd lens | 49.68607 | 1.425896 | plastic | 1.565 | 58 | −17.2141 |
| 4 | | 8.07054 | 12.41534 | | | | |
| 5 | Aperture | plane | −0.33949 | plastic | | | |
| 6 | 3rd lens | 3.37181 | 1.957908 | | 1.565 | 58 | 3.90723 |
| 7 | | −5.09692 | 0.841654 | | | | |
| 8 | 4th lens | −11.6907 | 0.402838 | plastic | 1.65 | 21.4 | −3.16409 |
| 9 | | 2.55551 | 0.113596 | | | | |
| 10 | 5th lens | 4.51333 | 1.251703 | plastic | 1.565 | 58 | 3.78464 |
| 11 | | −3.67781 | 0.8 | | | | |
| 12 | Infrared rays filter | plane | 0.85 | | 1.517 | 64.13 | |
| 13 | | plane | 1.597782 | | | | |
| 14 | Image plane | plane | | | | | |

Reference wavelength: 555 nm.

TABLE 8

Coefficients of the aspheric surfaces

| | Surface | | | | |
|---|---|---|---|---|---|
| | 1 | 2 | 3 | 4 | 6 |
| k | 1.440261 | −0.882584 | 15.474721 | 1.329643 | −1.777957 |
| A4 | | −2.42256E−04 | 3.88845E−06 | 1.92207E−04 | 4.06841E−03 |
| A6 | | 4.64768E−06 | −1.05379E−06 | −6.11009E−06 | −6.79747E−04 |
| A8 | | 4.19833E−09 | −3.90435E−10 | 1.42111E−06 | 1.97809E−04 |
| A10 | | 2.40979E−14 | −1.01661E−11 | −1.78650E−08 | −5.44745E−05 |
| A12 | | −7.06167E−13 | 1.79656E−12 | 4.24081E−20 | −1.78608E−19 |
| A14 | | −8.98687E−15 | −1.23863E−14 | −7.48428E−21 | 4.70503E−23 |

| | Surface | | | | |
|---|---|---|---|---|---|
| | 7 | 8 | 9 | 10 | 11 |
| k | 2.84218 | 29.118433 | −4.78026 | 1.642938 | −0.452729 |
| A4 | 1.43420E−02 | −2.15386E−02 | −5.30632E−03 | −3.20956E−04 | 6.98376E−03 |
| A6 | −3.36527E−03 | 3.13942E−03 | 4.56969E−04 | −6.60907E−04 | 2.50386E−03 |
| A8 | 6.43266E−04 | 5.66152E−04 | 3.87991E−04 | 1.77597E−04 | 8.07165E−05 |
| A10 | −8.50804E−05 | −1.58101E−04 | −6.66387E−05 | −8.89048E−06 | 2.31349E−06 |
| A12 | −5.82874E−19 | −1.58113E−18 | 6.71158E−20 | 2.17312E−19 | 2.15148E−18 |
| A14 | 2.45073E−21 | 3.67320E−20 | 2.34160E−20 | −5.61147E−20 | 1.28473E−20 |

An equation of the aspheric surfaces of the fourth embodiment is the same as that of the first embodiment, and the definitions are the same as well.

The exact parameters of the fourth embodiment based on Table 7 and Table 8 are listed in the following table:

Fourth embodiment (Reference wavelength: 555 nm)

| | f/f1 | | | f/f2 | | | f/f3 | | | f/f4 | | | f/f5 | | | f1/f2 | |
|---|---|---|---|---|---|---|
| 0.09692 | 0.04959 | 0.21849 | 0.26981 | 0.22557 | 0.51171 |
| ΣPPR | ΣNPR | ΣPPR/ΣNPR | IN12/f | IN45/f | | f2/f3 | |
| 0.44406 | 0.41632 | 1.06664 | 20.00574 | 0.13306 | 4.40570 |
| TP3/(IN23 + TP3 + IN34) | | (TP1 + IN12)/TP2 | | (TP5 + IN45)/TP4 | |
| 0.13162 | | 17.58812 | | 3.38919 | |
| HOS | InTL | HOS/HOI | InS/HOS | ODT % | TDT % |
| 46.38980 | 43.14830 | 14.27378 | 0.16102 | −32.8438 | 43.2316 |
| HVT41 | HVT42 | HVT51 | HVT52 | HVT52/HOI | HVT52/HOS |
| 0.00000 | 0.00000 | 0.00000 | 1.83600 | 0.00000 | 0.00000 |
| TP2/TP3 | TP3/TP4 | InRS51 | InRS52 | | InRS51 |/TP5 | | InRS52 |/TP5 |
| 0.72828 | 4.86029 | 0.613775 | −0.22181 | 0.49035 | 0.17721 |
| PLTA | PSTA | NLTA | NSTA | SLTA | SSTA |
| −0.017 mm | 0.009 mm | −0.021 mm | 0.009 mm | 0.002 mm | −0.004 mm |

The figures related to the profile curve lengths obtained based on Table 7 and Table 8 are listed in the following table:

Fourth embodiment (Reference wavelength: 555 nnn)

| ARE | 1/2(HEP) | ARE value | ARE−1/2 (HEP) | 2(ARE/HEP) % | TP | ARE/TP (%) |
|---|---|---|---|---|---|---|
| 11 | 0.237 | 0.237 | −0.00014 | 99.94% | 8.000 | 2.96% |
| 12 | 0.237 | 0.237 | −0.00002 | 99.99% | 8.000 | 2.96% |
| 21 | 0.237 | 0.237 | −0.00014 | 99.94% | 1.426 | 16.62% |
| 22 | 0.237 | 0.237 | −0.00010 | 99.96% | 1.426 | 16.62% |
| 31 | 0.237 | 0.237 | 0.00006 | 100.02% | 1.958 | 12.11% |
| 32 | 0.237 | 0.237 | −0.00005 | 99.98% | 1.958 | 12.11% |
| 41 | 0.237 | 0.237 | −0.00012 | 99.95% | 0.403 | 58.84% |
| 42 | 0.237 | 0.237 | 0.00019 | 100.08% | 0.403 | 58.91% |
| 51 | 0.237 | 0.237 | −0.00003 | 99.99% | 1.252 | 18.94% |
| 52 | 0.237 | 0.237 | 0.00002 | 100.01% | 1.252 | 18.95% |

Fourth embodiment (Reference wavelength: 555 nnn)

| ARS | EHD | ARS value | ARS−EHD | (ARS/EHD) % | TP | ARS/TP (%) |
|---|---|---|---|---|---|---|
| 11 | 22.611 | 23.380 | 0.768 | 103.40% | 8.000 | 292.25% |
| 12 | 8.597 | 14.167 | 5.570 | 164.78% | 8.000 | 177.09% |
| 21 | 4.567 | 4.572 | 0.006 | 100.12% | 1.426 | 320.67% |
| 22 | 3.715 | 3.926 | 0.211 | 105.68% | 1.426 | 275.32% |
| 31 | 1.573 | 1.629 | 0.056 | 103.55% | 1.958 | 83.21% |
| 32 | 1.609 | 1.629 | 0.020 | 101.25% | 1.958 | 83.19% |
| 41 | 1.491 | 1.508 | 0.016 | 101.08% | 0.403 | 374.24% |
| 42 | 1.533 | 1.579 | 0.046 | 102.97% | 0.403 | 391.86% |
| 51 | 1.552 | 1.586 | 0.034 | 102.22% | 1.252 | 126.73% |
| 52 | 1.591 | 1.616 | 0.025 | 101.60% | 1.252 | 129.12% |

The results of the equations of the fourth embodiment based on Table 7 and Table 8 are listed in the following table:

Values related to the inflection points of the fourth embodiment
(Reference wavelength: 555 nm)

| | | | | | | |
|---|---|---|---|---|---|---|
| HIF121 | 9.84337 | HIF121/HOI | 3.02873 | SGI121 | 14.65000 | \|SGI121\|/(\|SGI121\| + TP1) | 0.64680 |
| HIF211 | 5.81845 | HIF211/HOI | 1.79029 | SGI211 | 0.32714 | \|SGI211\|/(\|SGI211\| + TP2) | 0.18661 |
| HIF212 | 8.09399 | HIF212/HOI | 2.49046 | SGI212 | 0.53217 | \|SGI212\|/(\|SGI212\| + TP2) | 0.27178 |
| HIF213 | 9.00407 | HIF213/HOI | 2.77048 | SGI213 | 0.60926 | \|SGI213\|/(\|SGI213\| + TP2) | 0.29937 |
| HIF421 | 1.92260 | HIF421/HOI | 0.59157 | SGI421 | 0.49885 | \|SGI421\|/(\|SGI421\| + TP4) | 0.55324 |
| HIF521 | 1.20884 | HIF521/HOI | 0.37195 | SGI521 | −0.17858 | \|SGI521\|/(\|SGI521\| + TP5) | 0.12486 |

Fifth Embodiment

Figure 5A:
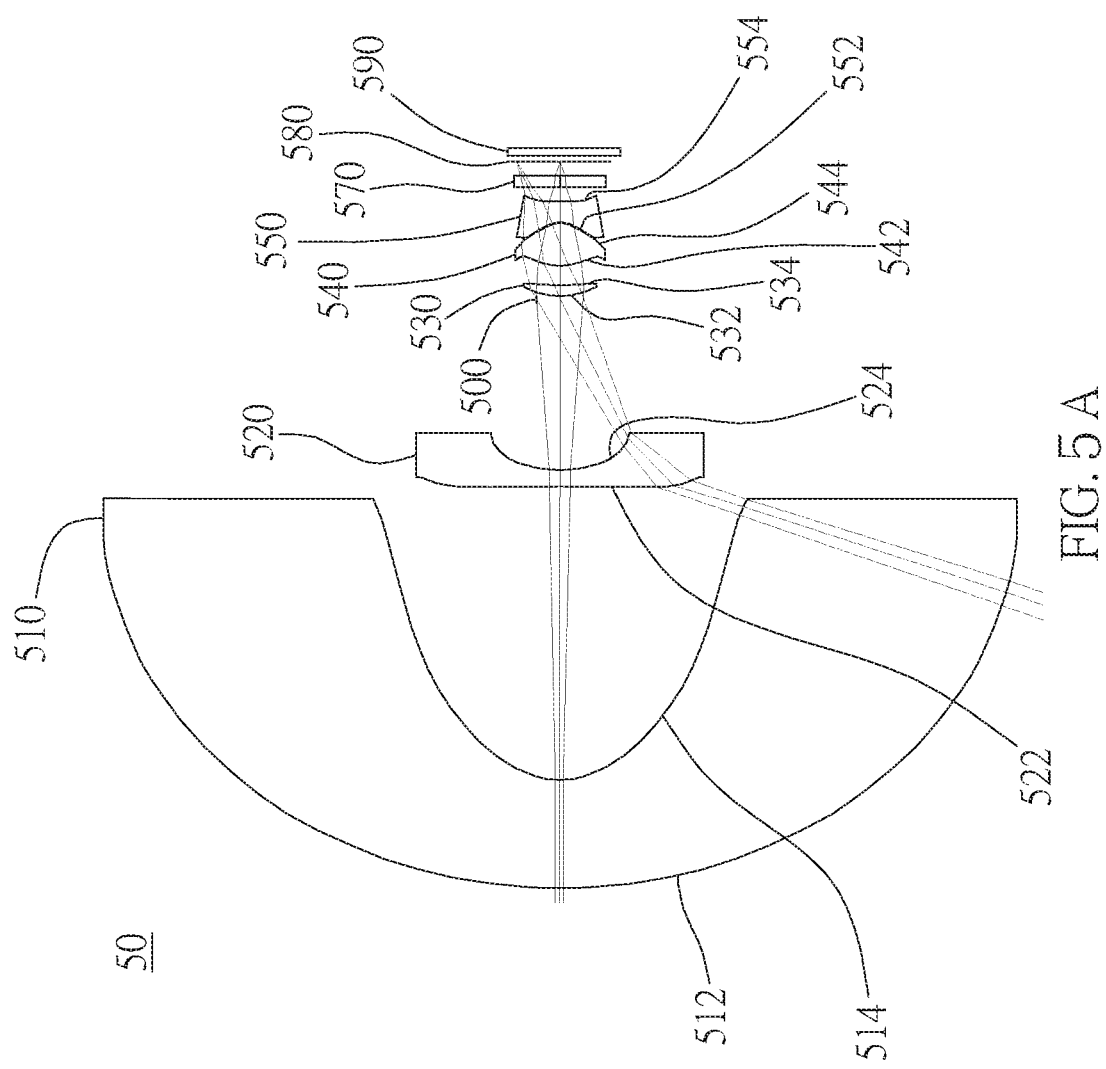
FIG. 5A is a schematic diagram of a fifth embodiment of the present invention.
Figure 5:
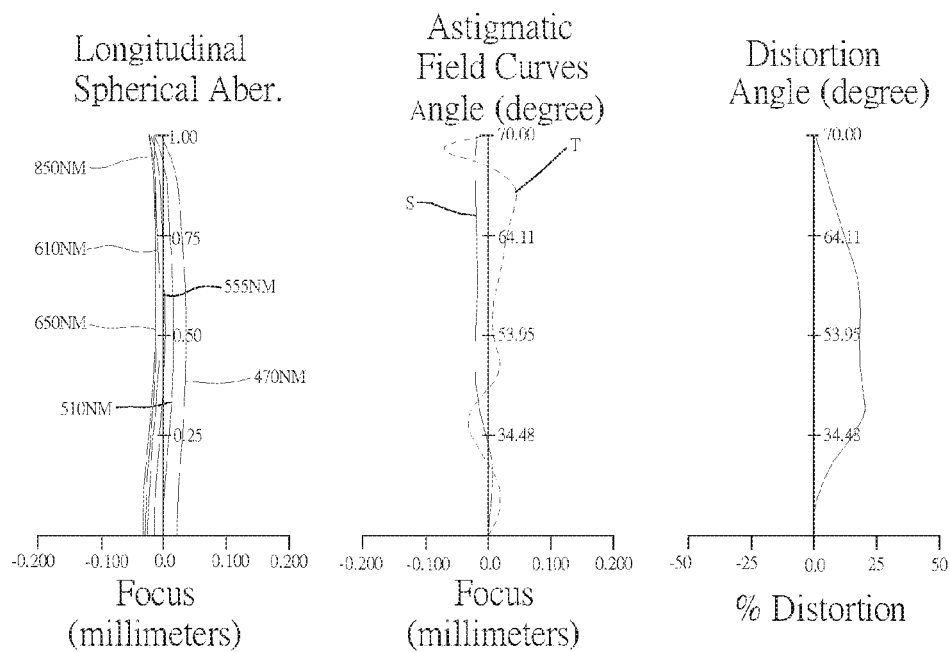
FIG. 5B shows curve diagrams of longitudinal spherical aberration, astigmatic field, and optical distortion of the optical image capturing system in the order from left to right of the fifth embodiment of the present application.
FIG. 5C shows a tangential fan and a sagittal fan of the optical image capturing system of the fifth embodiment of the present application, and a transverse aberration diagram at 0.7 field of view when a longest operation wavelength and a shortest operation wavelength pass through an edge of an aperture.
Figure 5:
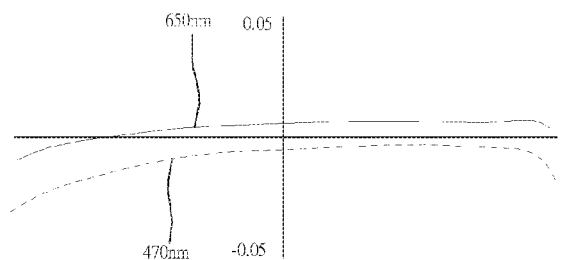
Figure 5:
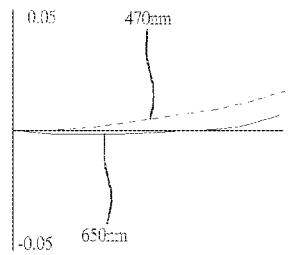

As shown in FIG. 5A and FIG. 5B, an optical image capturing system of the fifth embodiment of the present invention includes, along an optical axis from an object side to an image side, a first lens 510, a second lens 520, an aperture 500, a third lens 530, a fourth lens 540, a fifth lens 550, an infrared rays filter 580, an image plane 590, and an image sensor 592. FIG. 5C is a transverse aberration diagram at 0.7 field of view of the fifth embodiment of the present application.

The first lens 510 has negative refractive power and is made of plastic. An object-side surface 512, which faces the object side, is a convex aspheric surface, and an image-side surface 514, which faces the image side, is a concave aspheric surface. The image-side surface 514 has two inflection points.

The second lens 520 has negative refractive power and is made of plastic. An object-side surface 522 thereof, which faces the object side, is a concave aspheric surface, and an image-side surface 524 thereof, which faces the image side, is a concave aspheric surface. The object-side surface 522 has an inflection point.

The third lens 530 has positive refractive power and is made of plastic. An object-side surface 532, which faces the object side, is a convex aspheric surface, and an image-side surface 534, which faces the image side, is a concave aspheric surface. The image-side surface 534 has an inflection point.

The fourth lens 540 has positive refractive power and is made of plastic. An object-side surface 542, which faces the object side, is a convex aspheric surface, and an image-side surface 544, which faces the image side, is a convex aspheric surface. The object-side surface 542 has an inflection point.

The fifth lens 550 has negative refractive power and is made of plastic. An object-side surface 552, which faces the object side, is a concave surface, and an image-side surface 554, which faces the image side, is a convex surface. The object-side surface 552 and the image-side surface 554 both have an inflection point. It may help to shorten the back focal length to keep small in size.

The infrared rays filter 580 is made of glass and between the fifth lens 550 and the image plane 590. The infrared rays filter 580 gives no contribution to the focal length of the system.

The optical image capturing system of the second embodiment satisfies |f2|+|f3|+|f4|=32.3540 mm; |f1|+|f5|=17.2684 mm; and |f2|+|f3|+|f4|>|f1|+|f5|, where f2 is a focal length of the second lens 520, f3 is a focal length of the third lens 530, f4 is a focal length of the fourth lens 540, and f5 is a focal length of the fifth lens 550.

In the fifth embodiment, the optical image capturing system of the fifth embodiment further satisfies ΣPP=15.68241 mm; and f3/ΣPP=0.84738, where ΣPP is a sum of the focal lengths of each positive lens. It is helpful to share the positive refractive power of the third lens 530 to the other positive lens to avoid the significant aberration caused by the incident rays.

The optical image capturing system of the fifth embodiment further satisfies ΣNP=−33.93998 mm; and f1/ΣNP=0.42508, where ΣNP is a sum of the focal lengths of each negative lens. It is helpful to share the negative refractive power of the first lens 510 to other negative lenses.

The parameters of the lenses of the fifth embodiment are listed in Table 9 and Table 10.

TABLE 9 f = 1.17413 mm; f/HEP = 1.8; HAF = 70 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1$^{st}$ lens | 40.22805 | 7.97905 | plastic | 1.565 | 58 | −14.4273 |
| 2 | | 6.30816 | 21.79378 | | | | |
| 3 | 2$^{nd}$ lens | −100.262 | 1.208962 | plastic | 1.565 | 58 | −16.6716 |
| 4 | | 10.4778 | 12.54886 | | | | |
| 5 | Aperture | plane | 0.26643 | | | | |
| 6 | 3$^{rd}$ lens | 4.29722 | 0.829451 | plastic | 1.514 | 56.8 | 13.2889 |
| 7 | | 10.76718 | 1.440879 | | | | |
| 8 | 4$^{th}$ lens | 3.52308 | 3.112357 | plastic | 1.565 | 58 | 2.39351 |
| 9 | | −1.50105 | 0.097704 | | | | |
| 10 | 5$^{th}$ lens | −1.21547 | 1.599487 | plastic | 1.65 | 21.4 | −2.84108 |
| 11 | | −5.32344 | 1 | | | | |
| 12 | Infrared rays filter | plane | 0.85 | | 1.517 | 64.13 | |
| 13 | | plane | 1.00000 | | | | |
| 14 | Image plane | plane | | | | | |

Reference wavelength: 555 nm

TABLE 10

Coefficients of the aspheric surfaces

| | Surface | | | | |
|---|---|---|---|---|---|
| | 1 | 2 | 3 | 4 | 6 |
| k | 0.432575 | −0.794138 | −50 | 3.124682 | −7.66839 |
| A4 | | 1.38216E−05 | 7.79532E−05 | 3.03009E−04 | 6.50228E−03 |
| A6 | | −1.65220E−06 | −1.87356E−07 | −2.83718E−05 | −8.72992E−04 |
| A8 | | −3.95917E−09 | 9.86538E−11 | 2.28052E−06 | 1.33073E−04 |
| A10 | | 2.09628E−10 | −4.14409E−11 | −3.98770E−08 | −1.00686E−05 |
| A12 | | −2.86973E−13 | 1.42065E−12 | −3.17951E−12 | 2.30144E−19 |
| A14 | | −3.08344E−15 | −6.59100E−15 | 1.25435E−14 | 8.76433E−20 |

| | Surface | | | | |
|---|---|---|---|---|---|
| | 7 | 8 | 9 | 10 | 11 |
| k | −49.992715 | −3.526101 | −3.796562 | −3.268786 | −50 |
| A4 | −5.32697E−03 | 1.68416E−03 | −7.46776E−04 | 7.25558E−03 | 1.73448E−02 |
| A6 | 2.65009E−04 | −4.82435E−04 | −1.44832E−04 | −5.88601E−04 | −2.19366E−04 |
| A8 | 9.64475E−05 | 2.14704E−05 | −1.55010E−05 | −2.78615E−05 | −1.32293E−04 |
| A10 | −1.19181E−05 | −3.39621E−06 | 1.16646E−06 | 6.32027E−06 | 1.31507E−05 |
| A12 | −2.13985E−19 | 1.07881E−18 | −5.92227E−18 | −2.57488E−18 | −3.81495E−18 |
| A14 | 4.21422E−19 | −3.94386E−20 | −4.16111E−19 | 5.11577E−19 | 1.03587E−18 |

An equation of the aspheric surfaces of the fifth embodiment is the same as that of the first embodiment, and the definitions are the same as well.

The exact parameters of the fifth embodiment based on Table 9 and Table 10 are listed in the following table:

Fifth embodiment (Reference wavelength: 555 nm)

| \| f/f1 \| | \| f/f2 \| | \| f/f3 \| | \| f/f4 \| | \| f/f5 \| | \| f1/f2 \| |
|---|---|---|---|---|---|
| 0.08138 | 0.07043 | 0.08835 | 0.49055 | 0.41327 | 0.86538 |
| ΣPPR | ΣNPR | ΣPPR/\|ΣNPR\| | IN12/f | IN45/f | \| f2/f3 \| |
| 0.57890 | 0.56508 | 1.02446 | 18.56166 | 0.08321 | 1.25455 |
| TP3/(IN23 + TP3 + IN34) | | (TP1 + IN12)/TP2 | | (TP5 + IN45)/TP4 | |
| 0.05498 | | 24.62683 | | 0.54531 | |
| HOS | InTL | HOS/HOI | InS/HOS | ODT % | TDT % |
| 53.72700 | 50.87700 | 16.53138 | 0.18978 | 19.9227 | 17.9338 |
| HVT41 | HVT42 | HVT51 | HVT52 | HVT52/HOI | HVT52/HOS |
| 0.00000 | 0.00000 | 0.00000 | 1.22904 | 0.00000 | 0.00000 |
| TP2/TP3 | TP3/TP4 | InRS51 | InRS52 | \| InRS51 \|/TP5 | \| InRS52 \|/TP5 |
| 1.45754 | 0.26650 | −1.11932 | 0.25423 | 0.69980 | 0.15894 |
| PLTA | PSTA | NLTA | NSTA | SLTA | SSTA |
| −0.023 mm | 0.004 mm | −0.036 mm | −0.014 mm | 0.016 mm | 0.006 mm |

The figures related to the profile curve lengths obtained based on Table 9 and Table 10 are listed in the following table:

Fifth embodiment (Reference wavelength: 555 nm)

| ARE | 1/2(HEP) | ARE value | ARE-1/2 (HEP) | 2(ARE/HEP) % | TP | ARE/TP (%) |
|---|---|---|---|---|---|---|
| 11 | 0.326 | 0.326 | −0.00014 | 99.96% | 7.979 | 4.09% |
| 12 | 0.326 | 0.326 | −0.00000 | 100.00% | 7.979 | 4.09% |
| 21 | 0.326 | 0.326 | −0.00015 | 99.96% | 1.209 | 26.97% |
| 22 | 0.326 | 0.326 | −0.00009 | 99.97% | 1.209 | 26.97% |
| 31 | 0.326 | 0.326 | 0.00016 | 100.05% | 0.829 | 39.34% |
| 32 | 0.326 | 0.326 | −0.00010 | 99.97% | 0.829 | 39.31% |
| 41 | 0.326 | 0.326 | 0.00031 | 100.10% | 3.112 | 10.49% |
| 42 | 0.326 | 0.328 | 0.00222 | 100.68% | 3.112 | 10.55% |
| 51 | 0.326 | 0.330 | 0.00337 | 101.03% | 1.599 | 20.60% |
| 52 | 0.326 | 0.326 | 0.00003 | 100.01% | 1.599 | 20.39% |

Fifth embodiment (Reference wavelength: 555 nm)

| ARS | EHD | ARS value | ARS-EHD | (ARS/EHD) % | TP | ARS/TP (%) |
|---|---|---|---|---|---|---|
| 11 | 21.812 | 23.185 | 1.373 | 106.30% | 7.979 | 290.57% |
| 12 | 10.489 | 15.996 | 5.507 | 152.50% | 7.979 | 200.48% |
| 21 | 4.343 | 4.343 | −0.00024 | 99.99% | 1.209 | 359.20% |
| 22 | 3.702 | 3.830 | 0.128 | 103.46% | 1.209 | 316.82% |
| 31 | 1.956 | 2.012 | 0.056 | 102.86% | 0.829 | 242.52% |
| 32 | 1.984 | 1.985 | 0.001 | 100.06% | 0.829 | 239.32% |
| 41 | 2.181 | 2.263 | 0.083 | 103.80% | 3.112 | 72.72% |
| 42 | 2.061 | 2.247 | 0.186 | 109.03% | 3.112 | 72.20% |
| 51 | 1.974 | 2.148 | 0.174 | 108.83% | 1.599 | 134.28% |
| 52 | 1.745 | 1.749 | 0.004 | 100.24% | 1.599 | 109.36% |

The results of the equations of the fifth embodiment based on Table 9 and Table 10 are listed in the following table:

Value related to the inflection points of the fifth embodiment
(Reference wavelength: 555 nm)

| HIF121 | 12.2131 | HIF121/HOI | 3.75788 | SGI121 | 16.11670 | \|SGI121\|/(\|SGI121\| + TP1) | 0.66886 |
| HIF122 | 13.4470 | HIF122/HOI | 4.13754 | SGI122 | 20.31160 | \|SGI122\|/(\|SGI122\| + TP1) | 0.71796 |
| HIF211 | 3.25212 | HIF211/HOI | 1.00065 | SGI211 | −0.04358 | \|SGI211\|/(\|SGI211\| + TP2) | 0.03480 |
| HIF321 | 1.02590 | HIF321/HOI | 0.31566 | SGI321 | 0.03890 | \|SGI321\|/(\|SGI321\| + TP3) | 0.04480 |
| HIF411 | 1.92902 | HIF411/HOI | 0.59354 | SGI411 | 0.45431 | \|SGI411\|/(\|SGI411\| + TP4) | 0.12738 |
| HIF511 | 1.41443 | HIF511/HOI | 0.43521 | SGI511 | −0.52130 | \|SGI511\|/(\|SGI511\| + TP5) | 0.24580 |
| HIF521 | 0.64114 | HIF521/HOI | 0.19727 | SGI521 | −0.03054 | \|SGI521\|/(\|SGI521\| + TP5) | 0.01874 |

Sixth Embodiment

Figure 6A:
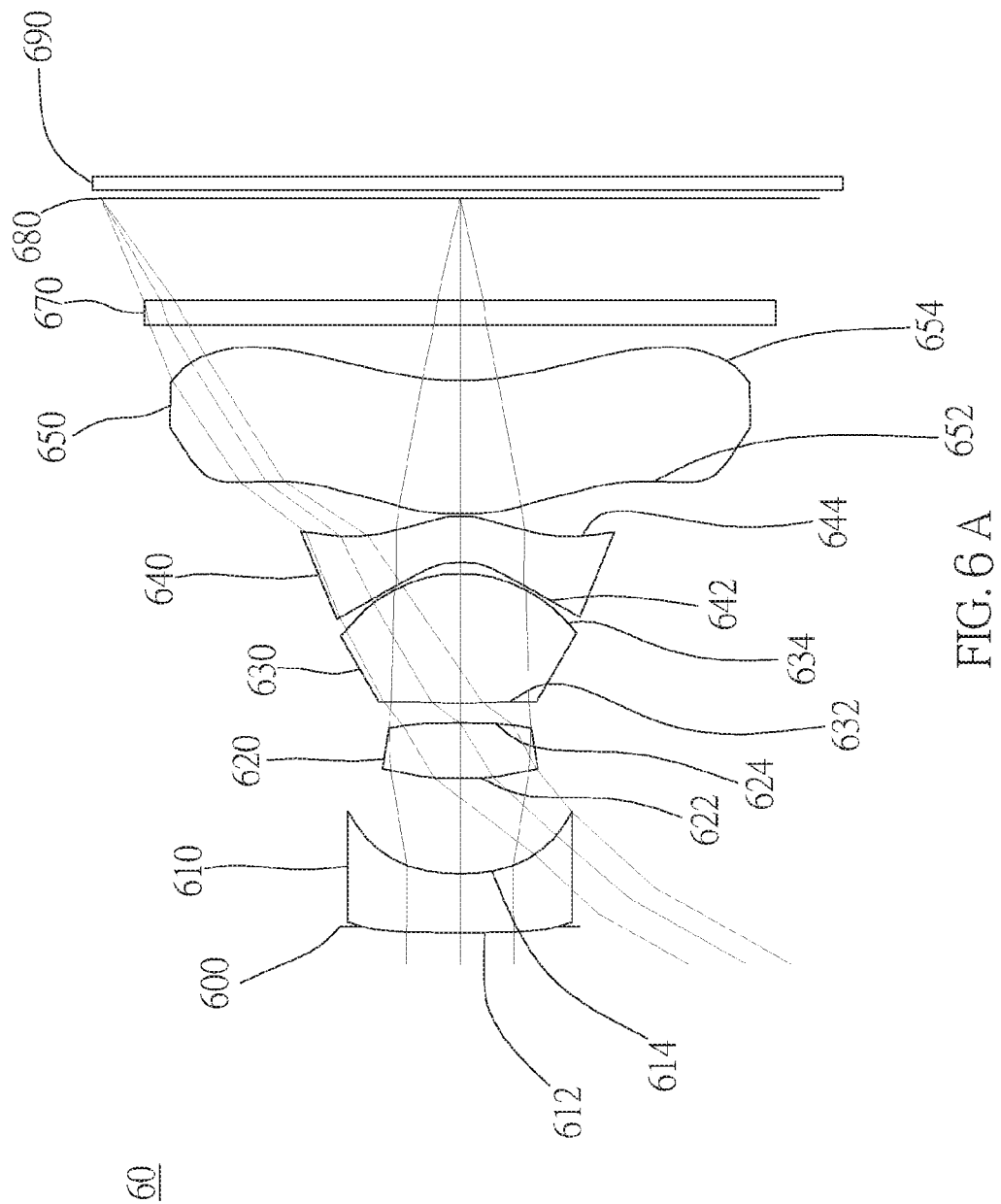
FIG. 6A is a schematic diagram of a sixth embodiment of the present invention.
Figure 6:
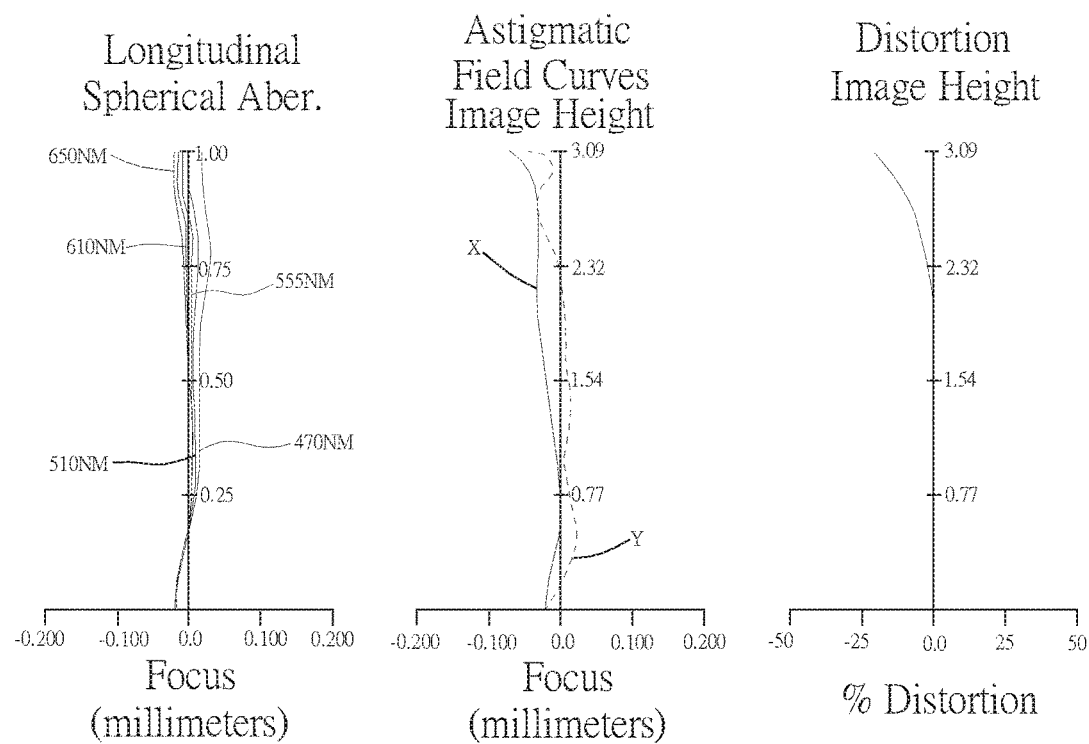
FIG. 6B shows curve diagrams of longitudinal spherical aberration, astigmatic field, and optical distortion of the optical image capturing system in the order from left to right of the sixth embodiment of the present application.
FIG. 6C shows a tangential fan and a sagittal fan of the optical image capturing system of the sixth embodiment of the present application, and a transverse aberration diagram at 0.7 field of view when a longest operation wavelength and a shortest operation wavelength pass through an edge of an aperture.
Figure 6:
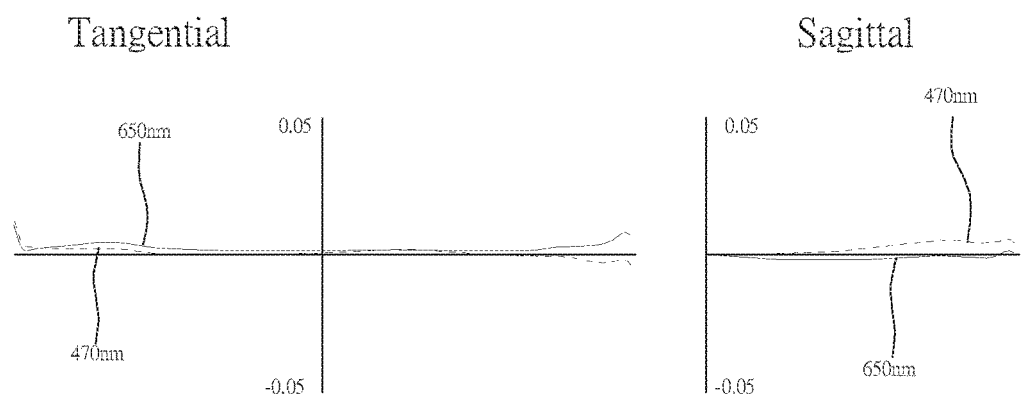

As shown in FIG. 6A and FIG. 6B, an optical image capturing system of the sixth embodiment of the present invention includes, along an optical axis from an object side to an image side, a first lens 610, a second lens 620, an aperture 600, a third lens 630, a fourth lens 640, a fifth lens 650, an infrared rays filter 680, an image plane 690, and an image sensor 692. FIG. 6C is a transverse aberration diagram at 0.7 field of view of the sixth embodiment of the present application.

The first lens 610 has negative refractive power and is made of plastic. An object-side surface 612, which faces the object side, is a convex aspheric surface, and an image-side surface 614, which faces the image side, is a concave aspheric surface. The object-side surface 612 and the image-side surface 614 both have an inflection point.

The second lens 620 has positive refractive power and is made of plastic. An object-side surface 622 thereof, which faces the object side, is a convex aspheric surface, and an image-side surface 624 thereof, which faces the image side, is a convex aspheric surface. The object-side surface 622 has an inflection point.

The third lens 630 has positive refractive power and is made of plastic. An object-side surface 632, which faces the object side, is a concave aspheric surface, and an image-side surface 634, which faces the image side, is a convex aspheric surface. The object-side surface 632 has an inflection point.

The fourth lens 640 has negative refractive power and is made of plastic. An object-side surface 642, which faces the object side, is a convex aspheric surface, and an image-side surface 644, which faces the image side, is a convex aspheric surface. The object-side surface 642 has two inflection points, and the image-side surface 644 has an inflection point.

The fifth lens 650 has positive refractive power and is made of plastic. An object-side surface 652, which faces the object side, is a concave surface, and an image-side surface 654, which faces the image side, is a concave surface. The object-side surface 652 has two inflection points, and the image-side surface 654 has an inflection point. It may help to shorten the back focal length to keep small in size. In addition, it may reduce an incident angle of the light of an off-axis field of view and correct the aberration of the off-axis field of view.

The infrared rays filter 680 is made of glass and between the fifth lens 650 and the image plane 690. The infrared rays filter 680 gives no contribution to the focal length of the system.

The optical image capturing system of the second embodiment satisfies $|f2|+|f3|+|f4|=8.4735$ mm; $|f1|+|f5|=8.9495$ mm; and $|f2|+|f3|+|f4|<|f1|+|f5|$, where f2 is a focal length of the second lens 620, f3 is a focal length of the third lens 630, f4 is a focal length of the fourth lens 640, and f5 is a focal length of the fifth lens 650.

In the sixth embodiment, the first lens 610, the third lens 630, and the fourth lenses 640 are positive lenses, and their focal lengths are f1, f3, and f4. The optical image capturing system of the sixth embodiment further satisfies $\Sigma PP=11.46338$ mm; and $f3/\Sigma PP=0.15626$, where $\Sigma PP$ is a sum of the focal lengths of each positive lens. It is helpful to share the positive refractive power of the third lens 630 to other positive lenses to avoid the significant aberration caused by the incident rays.

The optical image capturing system of the sixth embodiment further satisfies $\Sigma NP=-5.95967$ mm; and $f1/\Sigma NP=0.56425$, where $\Sigma NP$ is a sum of the focal lengths of each negative lens. It is helpful to share the negative refractive power of the first lens 610 to the other negative lens to avoid the significant aberration caused by the incident rays.

The parameters of the lenses of the sixth embodiment are listed in Table 11 and Table 12.

TABLE 11 f = 2.86808 mm; f/HEP = 2.427; HAF = 59.98930 deg

| Surface | | Radius of curvature (mm) | Thickness (mm) | Material | Refractive index | Abbe number | Focal length (mm) |
|---|---|---|---|---|---|---|---|
| 0 | Object | plane | 500 | | | | |
| 1 | 1st lens | 80 | 0.525587 | plastic | 1.5346 | 56.07 | −3.36272 |
| 2 | | 1.75976 | 0.84 | | | | |
| 3 | 2nd lens | 2.50746 | 0.482655 | plastic | 1.5346 | 56.07 | 4.0853 |
| 4 | | −16.2005 | 0.176572 | | | | |
| 5 | Aperture/ 3rd lens | 3.58683 | 1.140171 | plastic | 1.544 | 55.9671 | 1.79129 |
| 6 | | −1.19312 | 0.107572 | | | | |
| 7 | 4th lens | −0.52484 | 0.390937 | plastic | 1.6425 | 22.465 | −2.59695 |
| 8 | | −0.98628 | 0.025 | | | | |
| 9 | 5th lens | 1.47792 | 1.18381 | plastic | 1.544 | 55.9671 | 5.58679 |
| 10 | | 2.05696 | 0.485665 | | | | |
| 11 | Infrared rays filter | plane | 0.21 | BK_7 | 1.517 | 64.13 | |

TABLE 11-continued f = 2.86808 mm; f/HEP = 2.427; HAF = 59.98930 deg

| Surface | Radius of curvature (mm) | Thickness (mm) | Material | Refractive index | Abbe number | Focal length (mm) |
|---|---|---|---|---|---|---|
| 12 |  | plane | 0.912032 |  |  |  |
| 13 | Image plane | plane | 0 |  |  |  |

Reference wavelength: 555 nm; the position of blocking light: blocking at the second surface with effective semi diameter of 0.96 mm; blocking at the sixth surface with effective semi diameter of 0.99100243 mm; blocking at the eighth surface with effective semi diameter of 1.321298916 mm; blocking at the tenth surface with effective semi diameter of 2.491334616 mm.

TABLE 12

Coefficients of the aspheric surfaces

| Surface | | | | |
|---|---|---|---|---|
| 1 | 2 | 3 | 4 | 5 |
| k | −5.03000E+02 | 2.82082E−01 | −2.81667E−01 | 6.18050E+02 | −8.67154E+00 |
| A4 | 1.56330E+00 | 2.81910E−01 | −2.87192E−02 | −1.99638E−01 | −2.07474E−01 |
| A6 | −3.03630E+00 | −1.26529E−01 | 1.56940E−01 | −7.43995E−01 | −4.28819E−02 |
| A8 | 4.04600E+00 | 1.05290E+00 | −1.44078E+00 | 1.27258E+01 | −3.83914E−01 |
| A10 | 2.58410E+00 | −5.79479E+00 | 5.25994E+00 | −1.17552E+02 | 1.45579E+00 |
| A12 | −2.67010E+01 | 1.85953E+01 | −1.14969E+01 | 6.44464E+02 | −5.01920E+00 |
| A14 | 5.90370E+01 | −3.43207E+01 | 1.33073E+01 | −2.16063E+03 | 9.08970E+00 |
| A16 | −6.69520E+01 | 3.66455E+01 | −9.32783E+00 | 4.33535E+03 | −9.45118E+00 |
| A18 | 3.93600E+01 | −2.08628E+01 | 3.61733E+00 | −4.78357E+03 | 5.61873E+00 |
| A20 | −9.46730E+00 | 4.82551E+00 | −5.94958E−01 | 2.25196E+03 | −1.41300E+00 |

| Surface | | | | |
|---|---|---|---|---|
| 6 | 7 | 8 | 9 | 10 |
| k | −2.30231E+01 | −3.51400E+00 | −3.71880E+00 | −1.00547E+00 | −1.53590E+01 |
| A4 | −1.53729E+00 | −9.41775E−01 | 1.34105E−01 | −2.25483E−01 | 5.44650E+00 |
| A6 | 4.99856E+00 | 4.93538E+00 | 5.53718E−01 | 1.72556E−01 | −7.42230E+01 |
| A8 | −1.23474E+01 | −1.36981E+01 | −1.52715E+00 | −1.24767E−01 | 2.51900E+02 |
| A10 | 2.15799E+01 | 2.45281E+01 | 2.13619E+00 | 6.38251E−02 | −6.17910E+01 |
| A12 | −2.58352E+01 | −2.88164E+01 | −1.84328E+00 | −2.11807E−02 | −2.63260E+03 |
| A14 | 2.01272E+01 | 2.15397E+01 | 9.95443E−01 | 4.35764E−03 | 9.22460E+03 |
| A16 | −9.64398E+00 | −9.67225E+00 | −3.27089E−01 | −5.26526E−04 | −1.49020E+04 |
| A18 | 2.58796E+00 | 2.32583E+00 | 5.98985E−02 | 3.39000E−05 | 1.17850E+04 |
| A20 | −3.01617E−01 | −2.22032E−01 | −4.68891E−03 | −8.92970E−07 | −3.62630E+03 |

An equation of the aspheric surfaces of the sixth embodiment is the same as that of the first embodiment, and the definitions are the same as well.

The exact parameters of the sixth embodiment based on Table 11 and Table 12 are listed in the following table:

Sixth embodiment (Reference wavelength: 555 nm)

| | f/f1 | | | f/f2 | | | f/f3 | | | f/f4 | | | f/f5 | | | f1/f2 | |
|---|---|---|---|---|---|---|
| 0.66179 | 0.54474 | 1.24236 | 0.85694 | 0.39834 | 0.82313 |
| ΣPPR | ΣNPR | ΣPPR/|ΣNPR| | IN12/f | IN45/f | |f2/f3| |
| 2.18544 | 1.51873 | 1.43899 | 0.37746 | 0.01123 | 2.28065 |
| TP3/(IN23 + TP3 + IN34) | | (TP1 + IN12)/TP2 | | (TP5 + IN45)/TP4 | |
| 0.80050 | | 2.82932 | | 3.09208 | |
| HOS | InTL | HOS/HOI | InS/HOS | ODT % | TDT % |
| 6.48000 | 4.87230 | 2.09709 | 0.72207 | −20.2428 | 20.2233 |
| HVT41 | HVT42 | HVT51 | HVT52 | HVT52/HOI | HVT52/HOS |
| 0.00000 | 0.93469 | 1.64180 | 1.79310 | 0.53133 | 0.25336 |
| TP2/TP3 | TP3/TP4 | InRS51 | InRS52 | |InRS51|/TP5 | |InRS52|/TP5 |
| 0.42332 | 2.91651 | 0.285797 | 0.0076329 | 0.24142 | 0.00645 |
| PLTA | PSTA | NLTA | NSTA | SLTA | SSTA |
| −0.004 mm | 0.008 mm | 0.013 mm | 0.012 mm | 0.003 mm | 0.002 mm |

The figures related to the profile curve lengths obtained based on Table 11 and Table 12 are listed in the following table:

| | | | | Sixth embodiment (Reference wavelength: 555 nm) | | |
|---|---|---|---|---|---|---|
| ARE | 1/2(HEP) | ARE value | ARE- 1/2(HEP) | 2(ARE/ HEP) % | TP | ARE/TP (%) |
| 11 | 0.460 | 0.459 | −0.00038 | 99.92% | 0.526 | 87.35% |
| 12 | 0.460 | 0.467 | 0.00781 | 101.70% | 0.526 | 88.91% |
| 21 | 0.460 | 0.461 | 0.00190 | 100.41% | 0.483 | 95.60% |
| 22 | 0.460 | 0.460 | 0.00010 | 100.02% | 0.483 | 95.22% |
| 31 | 0.460 | 0.459 | −0.00007 | 99.99% | 1.140 | 40.30% |
| 32 | 0.460 | 0.473 | 0.01311 | 102.85% | 1.140 | 41.45% |
| 41 | 0.460 | 0.493 | 0.03337 | 107.26% | 0.391 | 126.08% |
| 42 | 0.460 | 0.469 | 0.00916 | 101.99% | 0.391 | 119.88% |
| 51 | 0.460 | 0.464 | 0.00488 | 101.06% | 1.184 | 39.23% |
| 52 | 0.460 | 0.462 | 0.00230 | 100.50% | 1.184 | 39.01% |

| ARS | EHD | ARS value | ARS- EHD | (ARS/ EHD) % | TP | ARS/TP (%) |
|---|---|---|---|---|---|---|
| 11 | 1.662 | 1.741 | 0.079 | 104.76% | 0.526 | 331.21% |
| 12 | 0.960 | 1.174 | 0.214 | 122.34% | 0.526 | 223.46% |
| 21 | 0.733 | 0.738 | 0.005 | 100.74% | 0.483 | 152.89% |
| 22 | 0.610 | 0.613 | 0.003 | 100.46% | 0.483 | 126.94% |
| 31 | 0.713 | 0.715 | 0.002 | 100.29% | 1.140 | 62.71% |
| 32 | 0.991 | 1.164 | 0.173 | 117.41% | 1.140 | 102.05% |
| 41 | 1.024 | 1.147 | 0.123 | 112.01% | 0.391 | 293.42% |
| 42 | 1.321 | 1.343 | 0.021 | 101.62% | 0.391 | 343.45% |
| 51 | 1.887 | 1.919 | 0.032 | 101.70% | 1.184 | 162.07% |
| 52 | 2.464 | 2.576 | 0.111 | 104.52% | 1.184 | 217.59% |

The results of the equations of the sixth embodiment based on Table 11 and Table 12 are listed in the following table:

| | | Values related to the inflection points of the sixth embodiment (Reference wavelength: 555 nnn) | | | | | |
|---|---|---|---|---|---|---|---|
| HIF111 | 1.47227 | HIF111/HOI | 0.47646 | SGI111 | 0.31329 | \|SGI111\|/(\|SGI111\| + TP1) | 0.37346 |
| HIF121 | 0.95363 | HIF121/HOI | 0.30862 | SGI121 | 0.54047 | \|SGI121\|/(\|SGI121\| + TP1) | 0.50698 |
| HIF211 | 0.55923 | HIF211/HOI | 0.18098 | SGI211 | 0.05926 | \|SGI211\|/(\|SGI211\| + TP2) | 0.10935 |
| HIF311 | 0.30660 | HIF311/HOI | 0.09922 | SGI311 | 0.01103 | \|SGI311\|/(\|SGI311\| + TP3) | 0.00958 |
| HIF411 | 0.55057 | HIF411/HOI | 0.17818 | SGI411 | −0.21628 | \|SGI411\|/(\|SGI411\| + TP4) | 0.35618 |
| HIF412 | 0.79077 | HIF412/HOI | 0.25591 | SGI412 | −0.35438 | \|SGI412\|/(\|SGI412\| + TP4) | 0.47547 |
| HIF421 | 0.44107 | HIF421/HOI | 0.14274 | SGI421 | −0.08049 | \|SGI421\|/(\|SGI421\| + TP4) | 0.17074 |
| HIF511 | 0.73656 | HIF511/HOI | 0.23837 | SGI511 | 0.13638 | \|SGI511\|/(\|SGI511\| + TP5) | 0.10330 |
| HIF512 | 1.82902 | HIF512/HOI | 0.59192 | SGI512 | 0.28955 | \|SGI512\|/(\|SGI512\| + TP5) | 0.19652 |
| HIF521 | 0.96915 | HIF521/HOI | 0.31364 | SGI521 | 0.15622 | \|SGI521\|/(\|SGI521\| + TP5) | 0.11658 |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
    a first lens having negative refractive power;
    a second lens having positive refractive power;
    a third lens having positive refractive power;
    a fourth lens having refractive power;
    a fifth lens having refractive power; and
    an image plane;
    wherein the optical image capturing system consists of the five lenses with refractive power; each lens among the first lens to the fifth lens has an object-side surface, which faces the object side, and an image-side surface, which faces the image side, and the object-side surface and the image-side surface of at least one lens among the first lens to the fifth lens are aspheric surfaces;
    wherein the optical image capturing system satisfies:

$1.2 \leq f/HEP \leq 6.0$;

$0 < InTL/HOS < 0.9$; and $0.9 \leq 2(ARE/HEP) \leq 1.5$;

where f1, f2, f3, f4, and f5 are focal lengths of the first lens to the fifth lens, respectively; f is a focal length of the optical image capturing system; HEP is an entrance pupil diameter of the optical image capturing system; HOS is a distance in parallel with the optical axis from an object-side surface of the first lens to the image plane; InTL is a distance from the object-side surface of the first lens to the image-side surface of the fifth lens; for any surface of any lens, ARE is a profile curve length measured from a start point where the optical axis passes there through, along a surface profile thereof, and finally to a coordinate point of a perpendicular distance where is a half of the entrance pupil diameter away from the optical axis;
    wherein the optical image capturing system further satisfies:

$50 \text{ deg} < HAF \leq 100 \text{ deg}$ where HAF is a half of a view angle of the optical image capturing system.

2. The optical image capturing system of claim 1, wherein the optical image capturing system further satisfies:
    $PLTA \leq 50$ μm;
    $PSTA \leq 50$ μm;
    $NLTA \leq 50$ μm;
    $NSTA \leq 50$ μm;
    $SLTA \leq 50$ μm;
    $SSTA \leq 50$ μm; and
    $|TDT| < 150\%$;
    where TDT is a TV distortion; HOI is a maximum height for image formation perpendicular to the optical axis on the image plane; PLTA is a transverse aberration at 0.7 HOI on the image plane in the positive direction of a tangential fan of the optical image capturing system after a longest operation wavelength passing through an edge of the aperture; PSTA is a transverse aberration at 0.7 HOI on the image plane in the positive direction of the tangential fan after a shortest operation wavelength passing through the edge of the aperture; NLTA is a transverse aberration at 0.7 HOI on the image plane in the negative direction of the tangential fan after the longest operation wavelength passing through the edge of the aperture; NSTA is a transverse aberration at 0.7 HOI on the image plane in the negative direction of the tangential fan after the shortest operation wavelength passing through the edge of the aperture; SLTA is a transverse aberration at 0.7 HOI on the image plane of a sagittal fan of the optical image capturing system after the longest operation wavelength passing through the edge of the aperture; SSTA is a transverse aberration at 0.7 HOI on the image plane of a sagittal fan after the shortest operation wavelength passing through the edge of the aperture.

3. The optical image capturing system of claim 1, wherein the optical image capturing system further satisfies:

$$0.9 \leq ARS/EHD \leq 2.0;$$

where, for any surface of any lens, EHD is a maximum effective half diameter thereof, ARS is a profile curve length measured from a start point where the optical axis passes therethrough, along a surface profile thereof, and finally to an end point of the maximum effective half diameter thereof.

4. The optical image capturing system of claim 1, wherein the optical image capturing system further satisfies:

$$0.5 \leq HOS/HOI \leq 25;$$

where HOI is a height for image formation perpendicular to the optical axis on the image lane.

5. The optical image capturing system of claim 1, wherein the optical image capturing system further satisfies:

$$0.05 \leq ARE51/TP5 \leq 15; \text{ and}$$

$$0.05 \leq ARE52/TP5 \leq 15;$$

where ARE51 is a profile curve length measured from a start point where the optical axis passes the object-side surface of the fifth lens, along a surface profile of the object-side surface of the fifth lens, and finally to a coordinate point of a perpendicular distance where is a half of the entrance pupil diameter away from the optical axis; ARE52 is a profile curve length measured from a start point where the optical axis passes the image-side surface of the fifth lens, along a surface profile of the image-side surface of the fifth lens, and finally to a coordinate point of a perpendicular distance where is a half of the entrance pupil diameter away from the optical axis; TP5 is a thickness of the fifth lens on the optical axis.

6. The optical image capturing system of claim 1, wherein the optical image capturing system further satisfies:

$$0.05 \leq ARE41/TP4 \leq 15; \text{ and}$$

$$0.05 \leq ARE42/TP4 \leq 15;$$

where ARE41 is a profile curve length measured from a start point where the optical axis passes the object-side surface of the fourth lens, along a surface profile of the object-side surface of the fourth lens, and finally to a coordinate point of a perpendicular distance where is a half of the entrance pupil diameter away from the optical axis; ARE42 is a profile curve length measured from a start point where the optical axis passes the image-side surface of the fourth lens, along a surface profile of the image-side surface of the fourth lens, and finally to a coordinate point of a perpendicular distance where is a half of the entrance pupil diameter away from the optical axis; TP4 is a thickness of the fourth lens on the optical axis.

7. The optical image capturing system of claim 1, further comprising an aperture, wherein the optical image capturing system further satisfies:

$$0.2 \leq InS/HOS \leq 1.1;$$

where InS is a distance in parallel with the optical axis between the aperture and the image plane.

8. An optical image capturing system, in order along an optical axis from an object side to an image side, comprising:

a first lens having negative refractive power;
a second lens having negative refractive power;
a third lens having positive refractive power;
a fourth lens having refractive power;
a fifth lens having refractive power; and
an image plane;
wherein the optical image capturing system consists of the five lenses with refractive power; at least a surface of at least one lens among the first lens to the fifth lens has at least an inflection point; at least one lens among the first lens to the fifth lens is made of plastic; each lens among the first lens to the fifth lens has an object-side surface, which faces the object side, and an image-side surface, which faces the image side, and both the object-side surface and the image-side surface of at least one lens among the first lens to the fifth lens are aspheric surfaces;
wherein the optical image capturing system satisfies:

$$1.2 \leq f/HEP \leq 6.0;$$

$$0 < InTL/HOS < 0.9; \text{ and}$$

$$0.9 < 2(ARE/HEP) < 1.5;$$

where f1, f2, f3, f4, and f5 are focal lengths of the first lens to the fifth lens, respectively; f is a focal length of the optical image capturing system; HEP is an entrance pupil diameter of the optical image capturing system; HOS is a distance in parallel with the optical axis between an object-side surface, which face the object side, of the first lens and the image plane; InTL is a distance from the object-side surface of the first lens to the image-side surface of the third lens; for any surface of any lens, ARE is a profile curve length measured from a start point where the optical axis passes there through, along a surface profile thereof, and finally to a coordinate point of a perpendicular distance where is a half of the entrance pupil diameter away from the optical axis;
wherein the optical image capturing system further satisfies:

$$50 \text{ deg} < HAF \leq 100 \text{ deg};$$

where HAF is a half of a view angle of the optical image capturing system.

9. The optical image capturing system of claim 8, wherein the optical image capturing system further satisfies:

$$0.9 \leq ARS/EHD \leq 2.0;$$

where, for any surface of any lens, EHD is a maximum effective half diameter thereof, ARS is a profile curve length measured from a start point where the optical axis passes therethrough, along a surface profile thereof, and finally to an end point of the maximum effective half diameter thereof.

10. The optical image capturing system of claim 8, wherein the optical image capturing system further satisfies:

$PLTA \leq 50 \ \mu m;$ $PSTA \leq 50 \ \mu m;$ $NLTA \leq 50 \ \mu m;$ $NSTA \leq 50 \ \mu m;$ $SLTA \leq 50 \ \mu m;$ and $SSTA \leq 50 \ \mu m;$ where HOI is a maximum height for image formation perpendicular to the optical axis on the image plane; PLTA is a transverse aberration at 0.7 HOI on the image plane in the positive direction of a tangential fan of the optical image capturing system after a longest operation wavelength passing through an edge of the aperture; PSTA is a transverse aberration at 0.7 HOI on the image plane in the positive direction of the tangential fan after a shortest operation wavelength passing through the edge of the aperture; NLTA is a transverse aberration at 0.7 HOI on the image plane in the negative direction of the tangential fan after the longest operation wavelength passing through the edge of the aperture; NSTA is a transverse aberration at 0.7 HOI on the image plane in the negative direction of the tangential fan after the shortest operation wavelength passing through the edge of the aperture; SLTA is a transverse aberration at 0.7 HOI on the image plane of a sagittal fan of the optical image capturing system after the longest operation wavelength passing through the edge of the aperture; SSTA is a transverse aberration at 0.7 HOI on the image plane of a sagittal fan after the shortest operation wavelength passing through the edge of the aperture.

11. The optical image capturing system of claim 8, wherein the third lens is made of plastic.

12. The optical image capturing system of claim 8, wherein the optical image capturing system further satisfies:

$0 < IN12/f \leq 5.0;$ where IN12 is a distance on the optical axis between the first lens and the second lens.

13. The optical image capturing system of claim 8, wherein the optical image capturing system further satisfies:

$0 < IN45/f \leq 5.0;$ where IN45 is a distance on the optical axis between the fourth lens and the fifth lens.

14. The optical image capturing system of claim 8, wherein the optical image capturing system further satisfies:

$0.1 \leq (TP5+IN45)/TP4 \leq 50;$ where IN45 is a distance on the optical axis between the fourth lens and the fifth lens; TP5 is a thickness of the fifth lens on the optical axis; TP5 is a thickness of the fifth lens on the optical axis.

15. The optical image capturing system of claim 8, wherein the optical image capturing system further satisfies:

$0.1 \leq (TP1+IN12)/TP2 \leq 50;$ where IN12 is a distance on the optical axis between the first lens and the second lens; TP1 is a thickness of the first lens on the optical axis; TP2 is a thickness of the second lens on the optical axis.

16. The optical image capturing system of claim 8, wherein at least one lens among the first lens to the fifth lens is a light filter, which is capable of filtering out light of wavelengths shorter than 500 nm.

17. An optical image capturing system, in order along an optical axis from an object side to an image side, comprising:
a first lens having negative refractive power;
a second lens having negative refractive power;
a third lens having positive refractive power;
a fourth lens having refractive power;
a fifth lens having refractive power; and
an image plane;
wherein the optical image capturing system consists of the five lenses having refractive power; at least a surface of at least one lens among the first lens to the fifth lens has at least an inflection point thereon; both an object-side surface, which faces the object side, and an image-side surface, which faces the image side, of the fourth lens are aspheric surfaces; both the object-side surface and the image-side surface of the fifth lens are aspheric surfaces;
wherein the optical image capturing system satisfies:

$1.2 \leq f/HEP \leq 3.5;$ $0.4 \leq |\tan(HAF)| \leq 6.0;$ $0 \leq InTL/HOS < 0.9;$ and $0.9 \leq 2(ARE/HEP) \leq 1.5;$ where f1, f2, f3, f4, and f5 are focal lengths of the first lens to the fifth lens, respectively; f is a focal length of the optical image capturing system; HEP is an entrance pupil diameter of the optical image capturing system; HAF is a half of a view angle of the optical image capturing system; HOS is a distance in parallel with the optical axis between an object-side surface, which face the object side, of the first lens and the image plane; InTL is a distance from the object-side surface of the first lens to the image-side surface of the fifth lens; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis;
wherein the optical image capturing system further satisfies:

$50 \ deg < HAF \leq 100 \ deg.$

18. The optical image capturing system of claim 17, wherein the optical image capturing system further satisfies:

$0.9 \leq ARS/EHD \leq 2.0;$ where, for any surface of any lens, EHD is a maximum effective half diameter thereof, ARS is a profile curve length measured from a start point where the optical axis passes therethrough, along a surface profile thereof, and finally to an end point of the maximum effective half diameter thereof.

19. The optical image capturing system of claim 17, wherein the optical image capturing system further satisfies:

$0.5 \leq HOS/HOI \leq 25;$ where HOI is a height for image formation perpendicular to the optical axis on the image plane.

20. The optical image capturing system of claim 17, wherein the optical image capturing system further satisfies:

$0.05 \leq ARE51/TP5 \leq 15$; and $0.05 \leq ARE52/TP5 \leq 15$;

where ARE51 is a profile curve length measured from a start point where the optical axis passes the object-side surface of the fifth lens, along a surface profile of the object-side surface of the fifth lens, and finally to a coordinate point of a perpendicular distance where is a half of the entrance pupil diameter away from the optical axis; ARE52 is a profile curve length measured from a start point where the optical axis passes the image-side surface of the fifth lens, along a surface profile of the image-side surface of the fifth lens, and finally to a coordinate point of a perpendicular distance where is a half of the entrance pupil diameter away from the optical axis; TP5 is a thickness of the fifth lens on the optical axis.

21. The optical image capturing system of claim 17, wherein the optical image capturing system further satisfies:

$0.05 \leq ARE41/TP4 \leq 15$; and $0.05 \leq ARE42/TP4 \leq 15$;

where ARE41 is a profile curve length measured from a start point where the optical axis passes the object-side surface of the fourth lens, along a surface profile of the object-side surface of the fourth lens, and finally to a coordinate point of a perpendicular distance where is a half of the entrance pupil diameter away from the optical axis; ARE42 is a profile curve length measured from a start point where the optical axis passes the image-side surface of the fourth lens, along a surface profile of the image-side surface of the fourth lens, and finally to a coordinate point of a perpendicular distance where is a half of the entrance pupil diameter away from the optical axis; TP4 is a thickness of the fourth lens on the optical axis.

22. The optical image capturing system of claim 17, further comprising an aperture an image sensor, and a driving module, wherein the image sensor is disposed on the image plane; the driving module is coupled with the lenses to move the lenses; the optical image capturing system further satisfies:

$0.2 \leq InS/HOS \leq 1.1$;

where InS is a distance in parallel with the optical axis between the aperture and the image plane.

* * * * *